United States Patent
Katoh et al.

(10) Patent No.: US 12,203,804 B2
(45) Date of Patent: Jan. 21, 2025

(54) ELECTRONIC BALANCE

(71) Applicant: SHIMADZU CORPORATION, Kyoto (JP)

(72) Inventors: Masahiro Katoh, Kyoto (JP); Atsushi Iizuka, Kyoto (JP); Hiroshi Hamamoto, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 360 days.

(21) Appl. No.: 17/744,735

(22) Filed: May 16, 2022

(65) Prior Publication Data
US 2022/0381604 A1    Dec. 1, 2022

(30) Foreign Application Priority Data

May 25, 2021  (JP) .................................. 2021-087996
Sep. 15, 2021 (JP) .................................. 2021-150487

(51) Int. Cl.
*G01G 21/28* (2006.01)
*G01G 7/02* (2006.01)
(Continued)

(52) U.S. Cl.
CPC ............. *G01G 21/286* (2013.01); *G01G 7/02* (2013.01); *G01G 21/22* (2013.01); *G01G 23/01* (2013.01)

(58) Field of Classification Search
CPC ........ G01G 7/02; G01G 21/286; G01G 21/22; G01G 23/01; G01G 19/414; G01G 23/3707; G01G 21/283; G01G 23/3735
See application file for complete search history.

(56) References Cited

U.S. PATENT DOCUMENTS 4,392,487 A * 7/1983 Selner ................... A61F 13/066
  602/27
4,862,401 A * 8/1989 Kubli .................. G06F 3/04895
  700/84
(Continued)

FOREIGN PATENT DOCUMENTS

JP    H02122328    10/1990
JP    H07294322    11/1995
(Continued)

OTHER PUBLICATIONS

Ohaus, "Explorer Series Semi-Micro Balances," obtained through the Internet on May 25, 2021, with English translation thereof, Available at: https://japan.ohaus.com/ja-JP/ExplorerSemi-MicroBalances-18.
(Continued)

*Primary Examiner* — Randy W Gibson
(74) *Attorney, Agent, or Firm* — JCIPRNET

(57) ABSTRACT

[Object] To provide an electronic balance configured to uses a non-contact sensor to perform a predetermined operation, in which a greater number of operations than the number of non-contact sensors can be performed.
[Means for solving problem] An electronic balance (1) includes: a non-contact sensor (31; 32) configured to detect an object; a state identifier (306) configured to identify a time pattern of a detection signal of the non-contact sensor (31; 32) as one of a plurality of previously defined time patterns; and an operation controller (30; 303; 304; 305) configured to control an operation of a predetermined section of the electronic balance (1) related to the time pattern identified by the state identifier.

10 Claims, 12 Drawing Sheets

(51) Int. Cl.
*G01G 21/22* (2006.01)
*G01G 23/01* (2006.01)

(56) References Cited

U.S. PATENT DOCUMENTS

| | | | | | |
|---|---|---|---|---|---|
| 5,058,692 | A | * | 10/1991 | Melcher | G01G 21/286 |
| | | | | | 177/238 |
| 5,567,918 | A | * | 10/1996 | Bachmann | G01G 23/3707 |
| | | | | | 702/123 |
| 6,246,018 | B1 | | 6/2001 | Schink | |
| 7,633,018 | B2 | * | 12/2009 | Leisinger | G01G 21/283 |
| | | | | | 702/173 |
| 10,393,569 | B2 | * | 8/2019 | Feldotte | G01S 15/58 |
| 2015/0204716 | A1 | * | 7/2015 | Lewandowski | E05F 15/73 |
| | | | | | 177/180 |
| 2018/0106665 | A1 | * | 4/2018 | Feldotte | G01S 7/493 |
| 2023/0113500 | A1 | * | 4/2023 | Oda | G01G 21/30 |
| | | | | | 177/180 |

FOREIGN PATENT DOCUMENTS

| | | |
|---|---|---|
| JP | 2000146681 | 5/2000 |
| JP | 2014031611 | 2/2014 |
| JP | 2016170176 | 9/2016 |

OTHER PUBLICATIONS

Ohaus, "Semi-micro balance," accessed on Jul. 2022, with English translation thereof, Available at: https://aimg.as-1.co.jp/c/61/5079/48/61507948cats.pdf?v=c6ecd7c226cabbda8b271c596c8082e3e8567e27.
"Office Action of Japan Counterpart Application", issued on Oct. 1, 2024, with English translation thereof, pp. 1-13.

* cited by examiner

0.0000g

Right touchless sensor (short)   Right door open-close key
Right touchless sensor (long)    Disabling key
Left touchless sensor (short)    O/T key
Left touchless sensor (long)     PRINT key

[OK] Close

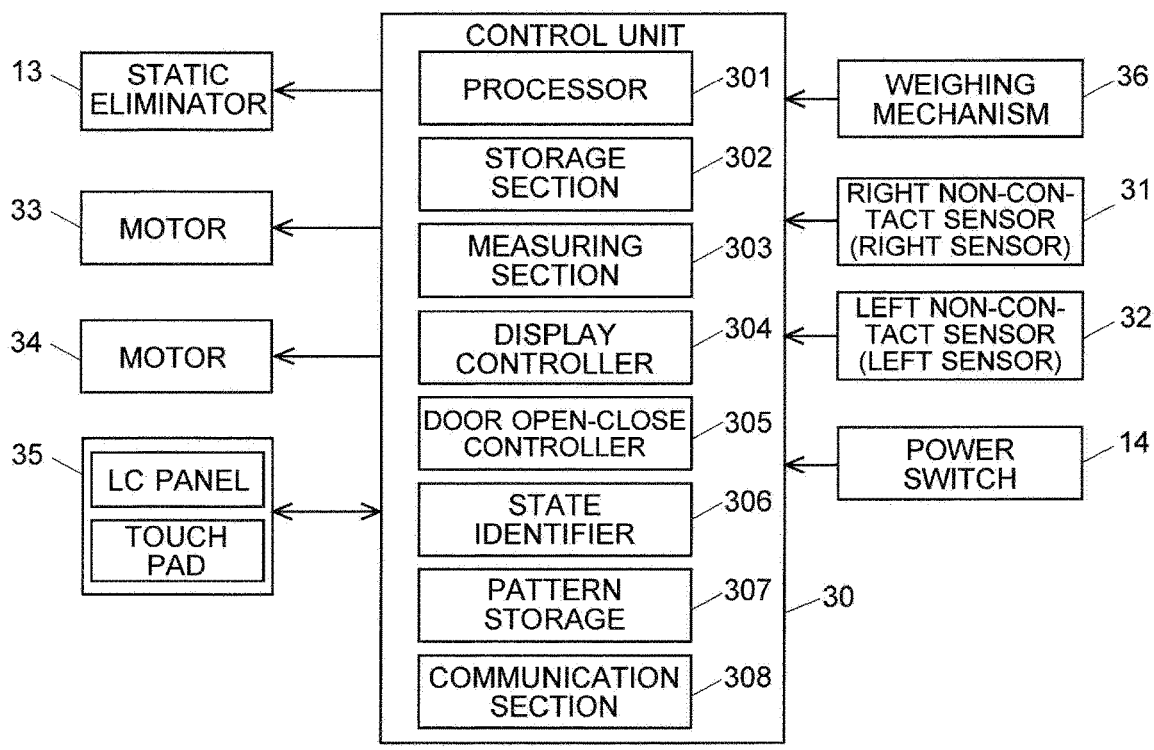
FIG. 4
| DETECTION PATTERN SENSOR(R):SENSOR(L) | | CONTENT OF OPERATION |
|---|---|---|
| 1 | SHORT:NONE | OPEN / CLOSE DOOR(R) |
| 2 | LONG:NONE | DISABLE |
| 3 | NONE:SHORT | SUBTRACT TARE (ZERO SETTING) |
| 4 | NONE:LONG | PRINT |
| 5 | LONG:LONG | SWITCH SCREEN |
| 6 | SHORT:SHORT | — |
FIG. 5
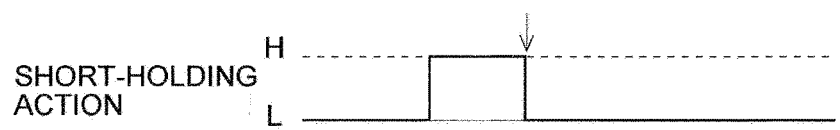
FIG. 6

| DETECTION PATTERN SENSOR(R):SENSOR(L) | | CONTENT OF OPERATION |
|---|---|---|
| 1 | SHORT:NONE | OPEN / CLOSE DOOR(R) |
| 2 | LONG:NONE | DISABLE / ENABLE SENSOR(R) |
| 3 | NONE:SHORT | OPEN / CLOSE DOOR(L) |
| 4 | NONE:LONG | DISABLE / ENABLE SENSOR(L) |
| 5 | LONG:LONG | SWITCH SCREEN |

| | DETECTION PATTERN SENSOR(R):SENSOR(L) | OPERATION IN MEASURED-VALUE DISPLAY SCREEN (1-4 ARE EXAMPLES) | OPERATION IN SETTING SCREEN |
|---|---|---|---|
| 1 | SHORT:NONE | OPEN / CLOSE DOOR(R) | MOVE DOWNWARD AT THE SAME LEVEL |
| 2 | LONG:NONE | ENABLE / DISABLE SENSOR | FIX THE SETTING WITH SELECTED OPTION, OR MOVE TO LOWER LEVEL (WHEN ITEM WITH ">" IS SELECTED) |
| 3 | NONE:SHORT | SUBTRACT TARE (ZERO SETTING) | MOVE TO HIGHER LEVEL |
| 4 | NONE:LONG | PRINT | (NONE) |
| 5 | LONG:LONG | SWITCH BETWEEN MEASURED-VALUE DISPLAY SCREEN AND SETTING SCREEN | |
| 6 | SHORT:SHORT | — | |

FIG. 15

ELECTRONIC BALANCE

CROSS-REFERENCE TO RELATED APPLICATION

This application claims the priority benefit of Japan application serial no. 2021-087996, filed on May 25, 2021 and Japan application serial no. 2021-150487, filed on Sep. 15, 2021. The entirety of each of the above-mentioned patent applications is hereby incorporated by reference herein and made a part of this specification.

BACKGROUND

Technical Field

The present invention relates to an electronic balance.

Background Art

Electronic balances are used in laboratories or similar locations to measure the mass (weight) of a powder sample or other types of specimens. This type of electronic balance has a windshield surrounding a measuring pan in order to shield the pan from an influence of a convection or other factors in the measurement environment. This windshield is provided with a door that can be opened and closed (see Patent Literature 1). A user opens the door of the windshield, places a specimen on the placement surface of the measuring pan of the electronic balance, closes the door of the windshield, and checks the weighing value on a display section to obtain the weight value of the specimen.

In some cases, it may be difficult for the user to manually open and close the door of the windshield when performing the measuring task. For example, for a user who has a spatula in his/her right hand and a reagent bottle in his/her left hand, it is difficult to manually open and close the door of the windshield since the user has no free hand. Therefore, an electronic balance which can automatically open and close the door of the windshield has been proposed (see Patent Literature 2 and Non Patent Literature 1).

CITATION LIST

Patent Literature

Patent Literature 1: JP 2016-170176 A
Patent Literature 2: JP 2000-146681 A

Non Patent Literature

Non Patent Literature 1: Explorer Semi-Micro Balances, OHAUS, [accessed on May 25, 2021], the Internet

SUMMARY OF INVENTION

Technical Problem

The electronic balance in Patent Literature 2 opens and closes the door of the windshield by operating a drive motor. The operation of this drive motor is initiated by the user's operation with an operation key or by a sensor which senses an object touching the handle attached to the door. In other words, in the electronic balance in Patent Literature 2, although a drive motor is used for opening and closing the door, the user is required to touch a specific portion of the electronic balance in order to activate the drive motor.

In the electronic balance in Non Patent Literature 1, a non-contact sensor configured to sense the presence/absence of an object by infrared radiation is employed as the open-close switch for the door of the windshield. In this electronic balance, when the user holds his/her hand over the non-contact sensor, the drive motor is operated to open the door of the windshield if the door is closed at that moment, or to close the door of the windshield if the door is open at that moment. Thus, this electronic balance allows the user to open and close the door of the windshield in a contactless manner.

In this type of electronic balance, the door may be opened or closed at a timing unintended by the user. For example, while the user is transferring a fraction of a sample from a reagent bottle onto the measuring pan with a spatula, the hand or clothes of the user, the reagent bottle or other objects may accidentally come in the vicinity of the non-contact sensor. If this situation is sensed through the non-contact sensor, the drive motor is activated and begins to close the door of the windshield, regardless of the intention of the user. If the moving door should collide with the spatula, the sample would be dropped into the measuring chamber surrounded by the windshield, so that the measuring chamber would be contaminated. The sample would also be useless.

In the previously described electronic balance, the function of the non-contact sensor can be disabled so that the drive motor will not be activated even when there is an object that would otherwise be sensed by the non-contact sensor. However, disabling the non-contact sensor requires manually operating an operation panel.

In addition to the open-close operation of the door of the windshield, non-contact sensors may possibly be used for operating other mechanical elements. In that case, it is necessary to additionally provide the electronic balance with a new non-contact sensor other than the one used for opening and closing the door.

The problem to be solved by the present invention is to enable the non-contact sensor to have various functions in a configuration in which a non-contact sensor is used to perform a predetermined operation of an electronic balance.

Solution to Problem

An electronic balance according to the present invention developed for solving the previously described problem includes:
  a non-contact sensor configured to detect an object;
  a state identifier configured to identify a time pattern of a detection signal of the non-contact sensor as one of a plurality of previously defined time patterns; and
  an operation controller configured to control an operation of a predetermined section of the electronic balance related to the time pattern identified by the state identifier.

Advantageous Effects of Invention

The electronic balance according to the present invention does not simply determine whether or not an object has been detected with the non-contact sensor. The state identifier identifies the time pattern of a detection signal of the non-contact sensor as one of the plurality of time patterns and relates each of the different types of time patterns to a different type of operation. Therefore, as compared to the conventional electronic balance in which a single type of operation is related to one non-contact sensor, the present invention allows the non-contact sensor to be related to a larger number of types of operations, thereby enabling the non-contact sensor to have various functions. The non-contact sensor used in the present case may be a type of non-contact sensor that continuously produces a detection signal while an object is being detected, in which case the detection signal can be classified as one of the plurality of time patterns based on the duration of the detection signal. In the case of using a type of non-contact sensor that produces a single detection signal each time it senses an object, a series of detection signals produced within a predetermined period of time can be classified as one of the plurality of time patterns based on the number of detection signals. Examples of the operations to be related to the plurality of time patterns include the opening and closing of the door of the windshield, activation of a static eliminator, subtraction of the tare weight, as well as the setting of the disabling and enabling of the non-contact sensor.

The number of non-contact sensors is not limited to one; there may be a plurality of non-contact sensors. In the case of using a plurality of non-contact sensors, the plurality of time patterns respectively detected by the non-contact sensors can be combined so as to provide the non-contact sensors with a wider variety of functions than in the case of using a single non-contact sensor.

BRIEF DESCRIPTION OF DRAWINGS

FIG. 4 is a block diagram schematically showing the main control system of the electronic balance according to the first embodiment.

FIG. 5 is an explanatory figure of a pattern table which contains detection patterns of the non-contact sensors and the contents of the operations related to those detection patterns in the electronic balance according to the first embodiment.

FIG. 6 is a timing chart showing detection signals corresponding to short-holding and long-holding actions.

FIG. 15 is an explanatory figure of a pattern table which contains detection patterns of the non-contact sensors and the contents of the operations related to those detection patterns in the electronic balance according to the fourth embodiment.

DESCRIPTION OF EMBODIMENTS

Figure 1:
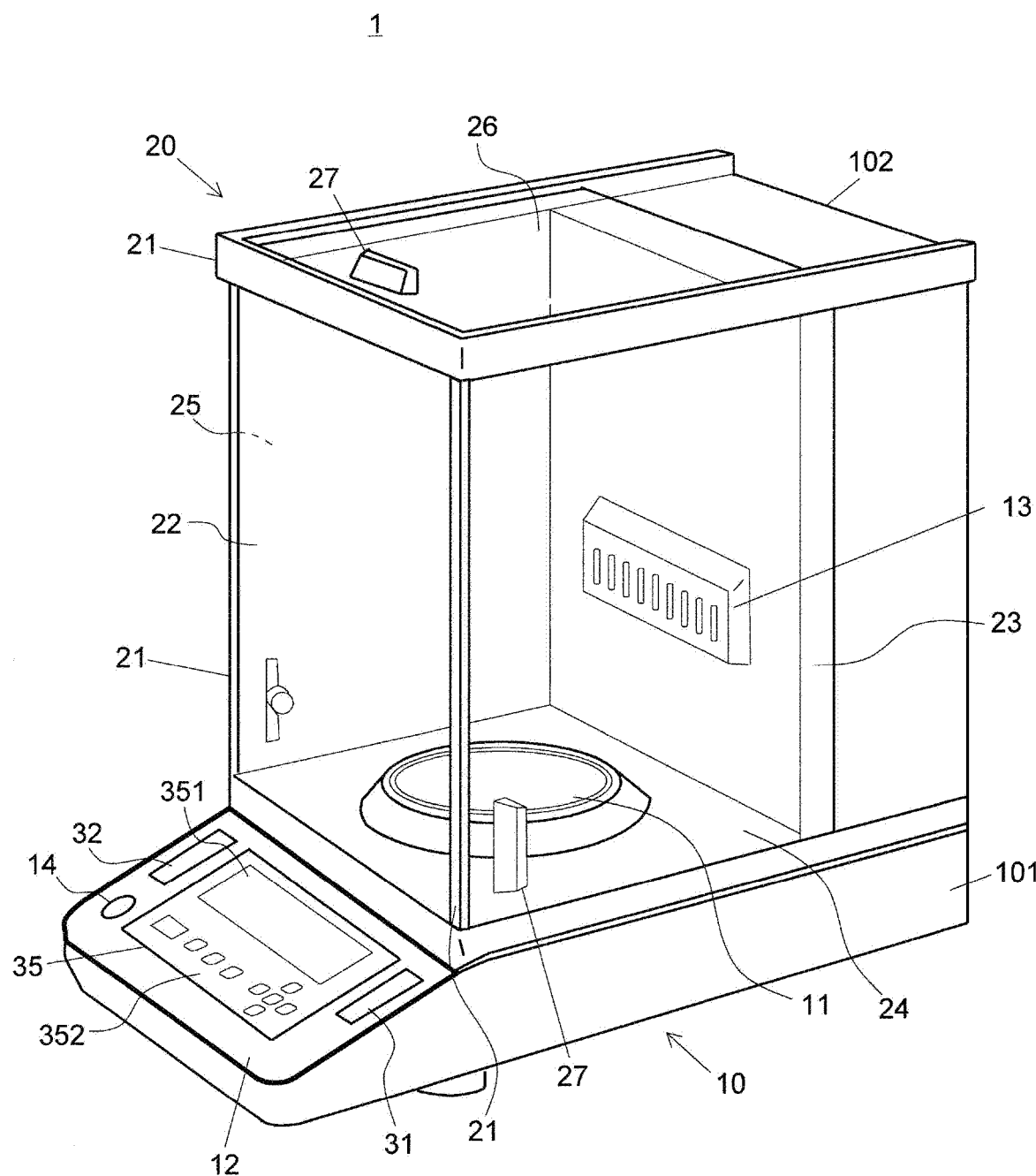
FIG. 1 is a perspective view of an electronic balance as the first embodiment of the present invention.

Embodiments of the present invention will be hereinafter described in detail referring to the drawings. It should be noted that the components which are identical or correspond to each other in the drawings are denoted by the same reference sign.

First Embodiment

<Overall Configuration of Electronic Balance>

Figures 2, 3A, 3B:
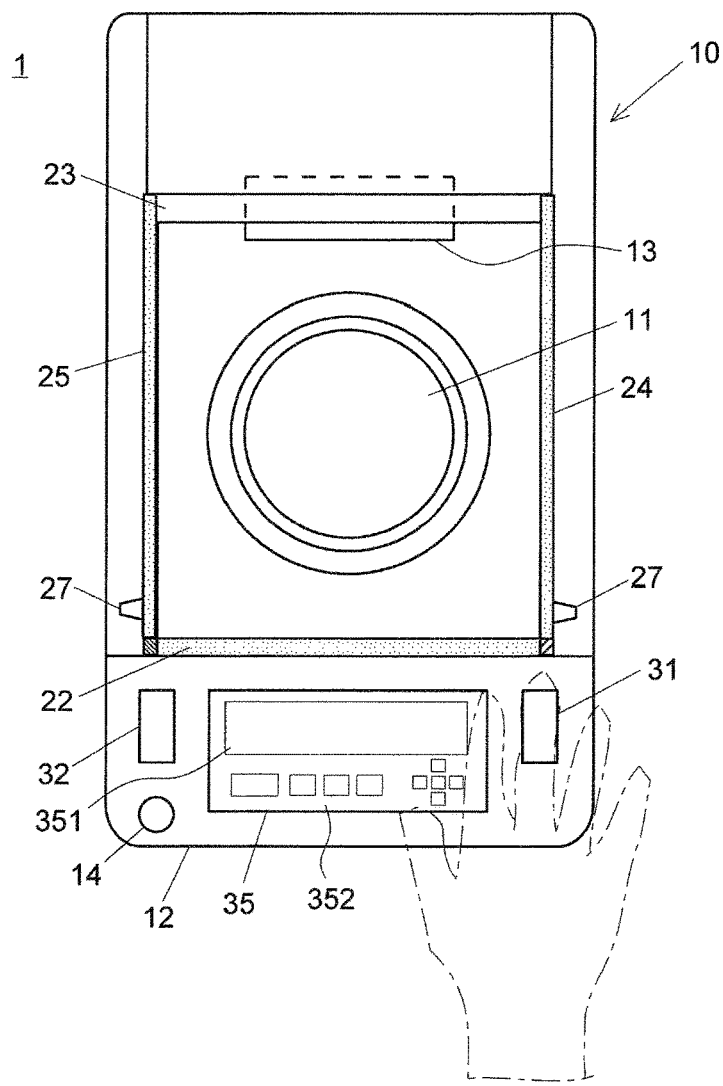
FIG. 2 is an outlined plan view of the electronic balance with the upper door removed.
FIG. 3A is a diagram showing an example of a measured-value display screen to be displayed in a display area of an input/display section in the electronic balance according to the first embodiment.
FIG. 3B is a diagram showing an example of a setting screen to be displayed in the display area of the input/display section in the electronic balance according to the first embodiment.

FIGS. 1-8 are diagrams for explaining an electronic balance 1 according to the present embodiment. As shown in FIGS. 1 and 2, the electronic balance 1 is a device for measuring the mass (weight) of a specimen (sample). The device includes: a main electronic-balance unit 10 consisting of a base 101 and a rear-section casing 102; a console 12 located on the front side of the top surface of the base 101; a measuring pan 11, located on the top surface of the base 101, on which a specimen is be placed; and a windshield 20 surrounding the measuring pan 11. The space surrounded by the windshield 20 forms the measuring chamber.

The weight of the specimen placed on the measuring pan 11 is detected by a weighing mechanism 36 (see FIG. 4) located within the base 101. As for the system for detecting the weight of the specimen, an electromagnetic system or a load cell system can be named, for example. When the weighing mechanism 36 is an electromagnetic system, the weighing mechanism 36 includes a column, lever, electromagnetic coil (force coil), permanent magnet, displacement sensor for detecting the displacement of the lever, and other components.

The windshield 20 includes: a front wall 22; a back wall 23; a frame 21 which holds the front wall 22 and connects the front wall 22 and the back wall 23 between their upper ends; as well as a right door 24, left door 25 and upper door 26 which are held by the frame 21 so that they can be opened and closed. The front wall 22, right door 24, left door 25 and upper door 26 are made of a transparent material, such as glass. Each of the right, left and upper doors 24, 25 and 26 has a grip 27. A user can manually open and close each of the right, left and upper doors 24, 25 and 26 by holding the grip 27. Each of the right and left doors 24 and 25 is driven by a door open-close mechanism (not shown) including a motor 33 or 34 (see FIG. 4) as its drive source. The motors 33 and 34 are contained in the rear-section casing 102.

The console 12 has a power switch 14, input/display section 35 and two non-contact sensors 31 and 32. The two non-contact sensors 31 and 32, which are arranged on both sides of the input/display section 35, are configured to sense an object, such as a hand as shown by the imaginary line in FIG. 2, in a contactless manner. The non-contact sensors 31 and 32 are hereinafter called the "right non-contact sensor 31" and the "left non-contact sensor 32", respectively.

Each of the right and left non-contact sensors 31 and 32 includes a reflective photosensor and senses an object by means of a specific wavelength of light which is emitted from a light-emitting element and enters a light-receiving element after being reflected by the object. Each of the right and left non-contact sensors 31 and 32 continuously produces a detection signal while the light reflected by the object is entering the light-receiving element. The photosensors can be, but are not limited to, infrared sensors which use infrared radiation as the specific wavelength of light. In place of the photosensors, pyroelectric infrared sensors for detecting infrared radiation which is emanated from a user can also be employed as the non-contact sensors.

The input/display section 35 consists of a touch panel in which a liquid crystal panel is combined with a touch pad. This section includes a display area 351 in which measured values and setting items are to be displayed, and an operation area 352 in which images that represent operation keys and buttons are to be displayed. FIGS. 3A and 3B show examples of the screens to be displayed in the display area 351. FIG. 3A is a measured-value display screen which is displayed in the measurement of the weight of a sample, while FIG. 3B is a setting screen in which the setting items related to the non-contact sensor are displayed. The measured-value display screen and the setting screen correspond to the first display screen and the second display screen in the present invention, respectively.

<Configuration of Control System of Electronic Balance>

FIG. 4 is a diagram schematically showing the control system of the electronic balance 1. The control unit 30 is a unit for controlling the operation of the electronic balance 1. A static eliminator 13, weighing mechanism 36, right non-contact sensor 31, left non-contact sensor 32, motors 33 and 34, power switch 14 as well as input/display section 35 are connected to the control unit 30. External devices, such as a printer, can also be connected to the control unit 30 via a communication section 308. The control unit 30 includes a processor (CPU) 301 and a storage section 302, as well as a measuring section 303, display controller 304, door open-close controller 305, state identifier 306, pattern storage section 307 and communication section 308 as its functional blocks. The function of each block in the control unit 30 is realized by the processor 301 executing a control program (software) stored in the storage section 302.

The measuring section 303 calculates the weight of the specimen placed on the measuring pan 11 based on the detection signal of the displacement sensor inputted from the weighing mechanism 36. The display controller 304 displays a predetermined display screen in the input/display section 35 based on an operation signal (or the like) of the power switch 14 or that of an operation key (or the like) in the operation area 352. The door open-close controller 305 drives the motors 33 and 34 to open and close the right door 24 and the left door 25. The pattern storage section 307 holds a pattern table which contains the time patterns to be detected by each of the right and left non-contact sensors 31 and 32 ("time patterns" are hereinafter simply called "patterns", while a time pattern detected by the non-contact sensors is called a "detection pattern") as well as the contents of the operations of the electronic balance 1 related to those time patterns. The state identifier 306 receives a detection signal from each of the right and left non-contact sensors 31 and 32, as well as identifies the detection pattern of the detection signals. The control unit 30 reads, from the pattern table, the content of the operation related to the detection pattern identified by the state identifier 306 and performs that operation through the measuring section 303, display controller 304, door open-close controller 305 or other related sections. Accordingly, the control unit 30, measuring section 303, display controller 304 and door open-close controller 305 in the present embodiment correspond to the operation controller.

<Pattern Table>

FIG. 5 shows an example of the pattern table stored in the pattern storage section 307. The pattern table in FIG. 5 shows that six detection patterns ("Patterns 1-6") are set according to the period of time during which a detection signal is continuously inputted to the control unit 30 ("the input period of the detection signal") from each of the right and left non-contact sensors 31 and 32, and a predetermined operation is related to each of the five detection patterns exclusive of Pattern 6 (in other words, no operation related to Pattern 6 is set for the present).

In this pattern table, the "right sensor" and "left sensor" represent the right non-contact sensor 31 and the left non-contact sensor 32, respectively. "Short" means that the input period of the detection signal is shorter than three seconds (i.e., a "short-holding action" has been performed in which the user holds his/her hand over the right or left non-contact sensor 31 or 32 for a short period of time). "Long" means that the input period of the detection signal is equal to or longer than three seconds (i.e., a "long-holding action" has been performed in which the user holds his/her hand over the right or left non-contact sensor 31 or 32 for a long period of time). "None" means no input of the detection signal (no hand-holding action has been performed over the right or left non-contact sensor 31 or 32). For example, Pattern 1 means that a "short-holding action" has been performed against the right non-contact sensor 31, with the result that a detection signal has been inputted from only the right non-contact sensor 31 to the control unit 30, and its input period is shorter than three seconds. Pattern 5 means that a "long-holding action" has been performed against both the right and left non-contact sensors 31 and 32, with the result that detection signals have been almost simultaneously inputted from the right and left non-contact sensors 31 and 32 to the control unit 30, and each of the input periods of those signals is equal to longer than three seconds. The phrase "almost simultaneously" means that there is a certain period of time during which the control unit 30 receives detection signals from both the right and left non-contact sensors 31 and 32; it does not require that the inputs of the detection signals from the right and left non-contact sensors 31 and 32 should occur in a synchronized fashion.

FIG. 6 shows a timing chart of the detection signals inputted to the control unit 30 during the short-holding and long-holding actions. The state identifier 306 concludes that a "short-holding action" has occurred when the period of time from the point where the detection signal changed from level "L" to "H" to the point where the signal returned to level "L" (at the point indicated by the downward arrow) has been equal to or shorter than three seconds, or that a "long-holding action" has occurred when the detection signal is at level "H" after three seconds from the point where the detection signal changed from level "L" to level "H".

In the initial state, the pattern table in the pattern storage section 307 holds the default settings. By displaying the setting screen on the input/display section 35 and operating the operation keys, operation buttons or other elements, the user can change the contents of the detection patterns as well as add, delete or modify the content of the operation related to a detection pattern. Modifying the content of a detection pattern means, for example, changing the lower limit of the input period corresponding to the "long-holding action" or the upper limit of the input period corresponding to the "short-holding action". The pattern table in which the detection patterns and contents of the operation have been thus edited is saved in the pattern storage section 307 and overwrites the previous table.

In the case of a configuration in which a personal computer having a display and an input operation means, such as a mouse and keyboard, is connected to the control unit 30 via the communication section 308, the control unit 30 may be configured to allow the user to modify or add a detection pattern or the content of the operation related to the detection pattern by operating the input operation means.

Although the detection signals in the present embodiment are classified into six detection patterns based on the length of the input period of each detection signal from the right and left non-contact sensors 31 and 32 as well as the presence or absence of the input of the detection signal, the classification of the detection signals into a plurality of detection patterns may also be performed based on the number of detection signals inputted from each of the right and left non-contact sensors 31 and 32 to the control unit 30 within a predetermined period of time.

<First Processing Based on Detection Signals from Non-Contact Sensors>

Figure 7:
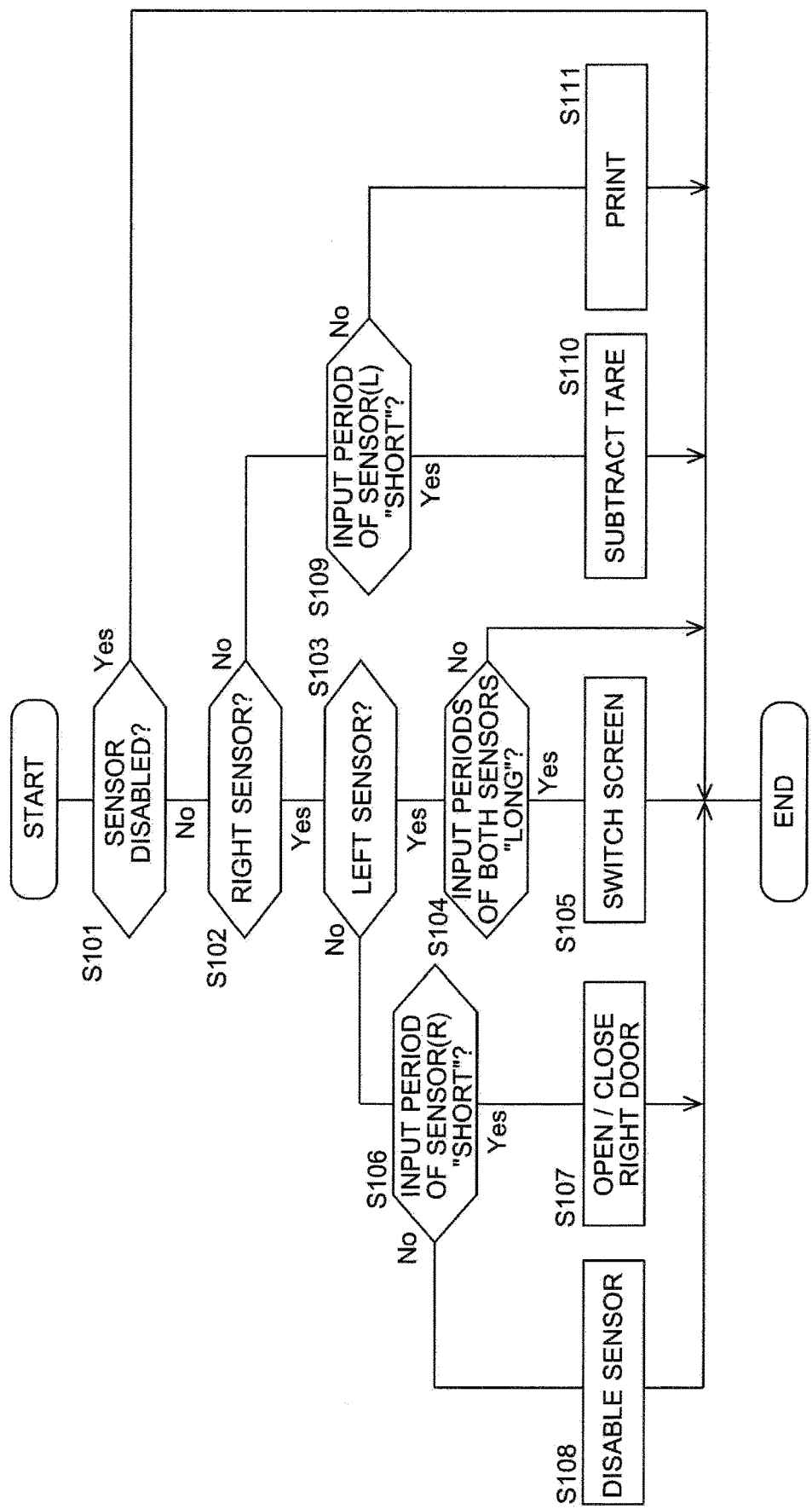
FIG. 7 is a flowchart showing the processing for an operation control using the detection signals of the non-contact sensors in the electronic balance according to the first embodiment.

Next, the process steps performed by the control unit 30 using the right and left non-contact sensors 31 and 32 to make the electronic balance 1 conduct predetermined operations will be described with reference to FIG. 7. The flowchart in FIG. 7 begins with an input of a detection signal from one of the right and left non-contact sensors 31 and 32 to the control unit 30. The processing in each step is performed by the functional components shown in FIG. 4.

Initially, the control unit 30 determines whether or not the setting for disabling the right and left non-contact sensors 31 and 32 is ON (Step 101). If the disabling setting is ON, the processing is immediately discontinued ("Yes" in Step 101). The "disabling setting" means that any detection signal inputted from the right and left non-contact sensors 31 and 32 to the control unit 30 will be treated as invalid. If the disabling setting of the right and left non-contact sensors 31 and 32 is OFF ("No" in Step 101), the control unit 30 subsequently determines whether the input it has received is one detection signal from one of the right and left non-contact sensors 31 and 32 or two detection signals from both sensors (Steps 102 and 103).

If the input is two detection signals from both the right and left non-contact sensors 31 and 32 ("Yes" in both Steps 102 and 103), the control unit 30 determines whether or not the input periods of the detection signals it has received from the right and left non-contact sensors 31 and 32 are both equal to or longer than three seconds. If both input periods are equal to or longer than three seconds ("Yes" in Step 104), the control unit 30 instructs the display controller 304 to change the screen displayed in the display area 351 of the input/display section 35 (Step 105). For example, when the measured-value display screen (FIG. 3A) is shown in the display area 351, this screen is replaced by the setting screen (FIG. 3B). Conversely, when the setting screen is displayed, this screen is replaced by the measured-value display screen.

As shown in FIG. 3B, among the patterns stored in the pattern table, the setting screen shows the contents of Patterns 1-4 in which the detection patterns have already been related to specific operations. It is assumed here that the content of the operation for Pattern 5 (i.e., the screen-switching) should not be displayed.

By viewing this setting screen, the user can recognize what type of operational action against the right and left non-contact sensors 31 and 32 will cause which elements of the electronic balance to operate, as well as whether or not the operations related to the detection patterns have been changed or modified by other users. It should be noted that the right and left non-contact sensors 31 and 32 are named the "right touchless sensor" and "left touchless sensor" in the setting screen, respectively. The action with the input period of the detection signal which is shorter than three seconds is described as "short", and the action with the input period which is equal to or longer than three seconds is described as "long". The "right door open-close key", "disabling key", "O/T key" and "PRINT key" indicate that the open-close operation of the right door 24, the disabling setting of the right and left non-contact sensors 31 and 32, the zero-point setting/tare subtraction, as well as the printing operation are related to the displayed actions, respectively.

In the case where the control unit 30 has received detection signals from both the right and left non-contact sensors 31 and 32, if at least one of those detection signals has an input period shorter than three seconds (i.e., in the case of Pattern 6 or any other detection pattern which is not set in the pattern table), the control unit 30 discontinues the processing without any reaction ("No" in Step 104).

In the case where the control unit 30 has received a detection signal from only the right non-contact sensor 31 ("Yes" in Step 102, and "No" in Step 103), the control unit 30 determines whether or not the input period of the detection signal is shorter than three seconds. If the input period is shorter than three seconds ("Yes" in Step 106), the control unit 30 instructs the door open-close controller 305 to conduct the open-close operation of the right door 24 (Step 107; Pattern 1). Specifically, if the right door 24 is closed, the door open-close controller 305 drives the motor 33 in the forward direction to open the right door 24, or if the right door 24 is open, the door open-close controller 305 drives the motor 33 in the reverse direction to close the right door 24. Whether the right door 24 is in the open or closed state can be determined, for example, based on the detection signal of a sensor for detecting the open-close state of the door provided in the door open-close mechanism.

If the input period of the detection signal from the right non-contact sensor 31 is equal to or longer than three seconds ("No" in Step 106), the control unit 30 disables the right and left non-contact sensors 31 and 32 (Step 108; Pattern 2). By this operation, the disabling setting of the right and left non-contact sensors 31 and 32 is turned on. After this point, even when the detection signal or signals inputted from one or both of the right and left non-contact sensors 31 and 32 to the control unit 30 correspond to one of the five detection patterns set in the pattern table, the control unit 30 will not perform the operation assigned to that detection pattern (this reaction corresponds to the processing in Step 101). In the present embodiment, it is assumed that the disabling setting of the right and left non-contact sensors 31 and 32 can be turned off by touching the display area 351 of the input/display section 35 for a predetermined period of time (e.g., equal to or longer than five seconds).

In the case where the control unit 30 has received a detection signal from only the left non-contact sensor 32 ("No" in Step 102), the control unit 30 determines whether or not the input period of the detection signal is shorter than three seconds. If the input period is shorter than three seconds ("Yes" in Step 109; Pattern 3), the control unit 30 instructs the measuring section 303 to conduct the zero-point setting/tare subtraction (Step 110). The "zero-point setting/tare subtraction" is an operation performed in the case of measuring the weight of a sample put in or on a tare (e.g., chartula or measuring tray), so as to subtract the weight of the tare and display the net weight of the sample as the measurement result on the measured-value display screen. After a tare is placed on the measuring pan 11, the tare subtraction is performed, whereupon the value displayed on the measured-value display screen is set to zero. The same tare, now holding a sample, is subsequently placed on the measuring pan 11. Then, the measured value of the net weight of the sample is displayed on the measured-value display screen.

If the input period of the detection signal from the non-contact sensor 32 is equal to or longer than three seconds ("No" in Step 109; Pattern 4), the control unit 30 sends a print command to the printer through the communication section 308. The printer produces a print-out of the contents displayed in the display area 351 of the input/display section 35 (Step 111).

<Measuring Operation>

Hereinafter described are operations performed when a user places a measuring tray containing a sample through the right door 24 into the measuring chamber and conducts a measurement of the weight of the sample.

When the right door 24 is closed, the user holds his/her hand over the right non-contact sensor 31 for a period of time shorter than three seconds (Pattern 1). According to this action, the door open-close controller 305 drives the motor 33 to open the right door 24. The user subsequently places the measuring tray on the measuring pan 11 and holds his/her hand over the left non-contact sensor 32 for a period of time shorter than three seconds (Pattern 3). According to this action, the measuring section 303 performs the tare subtraction, and "0" is displayed as the measured value on the measured-value display screen in the display area of the input/display section 35. The user subsequently removes the measuring tray from the measuring pan 11, puts a sample in the measuring tray, replaces the same tray onto the measuring pan 11, and holds his/her hand over the right non-contact sensor 31 for a period of time shorter than three seconds. Then, the door open-close controller 305 drives the motor 33 to close the right door 24.

The measuring section 303 calculates the net weight of the sample by subtracting the weight of the measuring tray from the total weight of the measuring tray and the sample placed on the measuring pan 11. Consequently, the measured value of the weight of the sample is displayed on the measured-value display screen in the display area of the input/display section 35. In this situation, the user holds his/her hand over the left non-contact sensor 32 for a period of time equal to or longer than three seconds. Then, the printer produces a print-out of the contents of the measured-value display screen.

After the right door 24 has been opened, the user holds his/her hand over the right non-contact sensor 31 for a period of time equal to or longer than three seconds, whereby the right and left non-contact sensors 31 and 32 are disabled. This setting allows the user to place the measuring tray onto the measuring pan and put the sample while avoiding a situation in which the right door 24 of the electronic balance 1 is unintentionally closed, or an operation assigned to a different detection pattern is unintentionally executed, due to a portion of the body of the user, the clothes of the user or a reagent bottle accidentally coming in the vicinity of the right non-contact sensor 31 and/or the left non-contact sensor 31.

<Second Processing Based on Detection Signals from Non-Contact Sensors>

Figure 8:
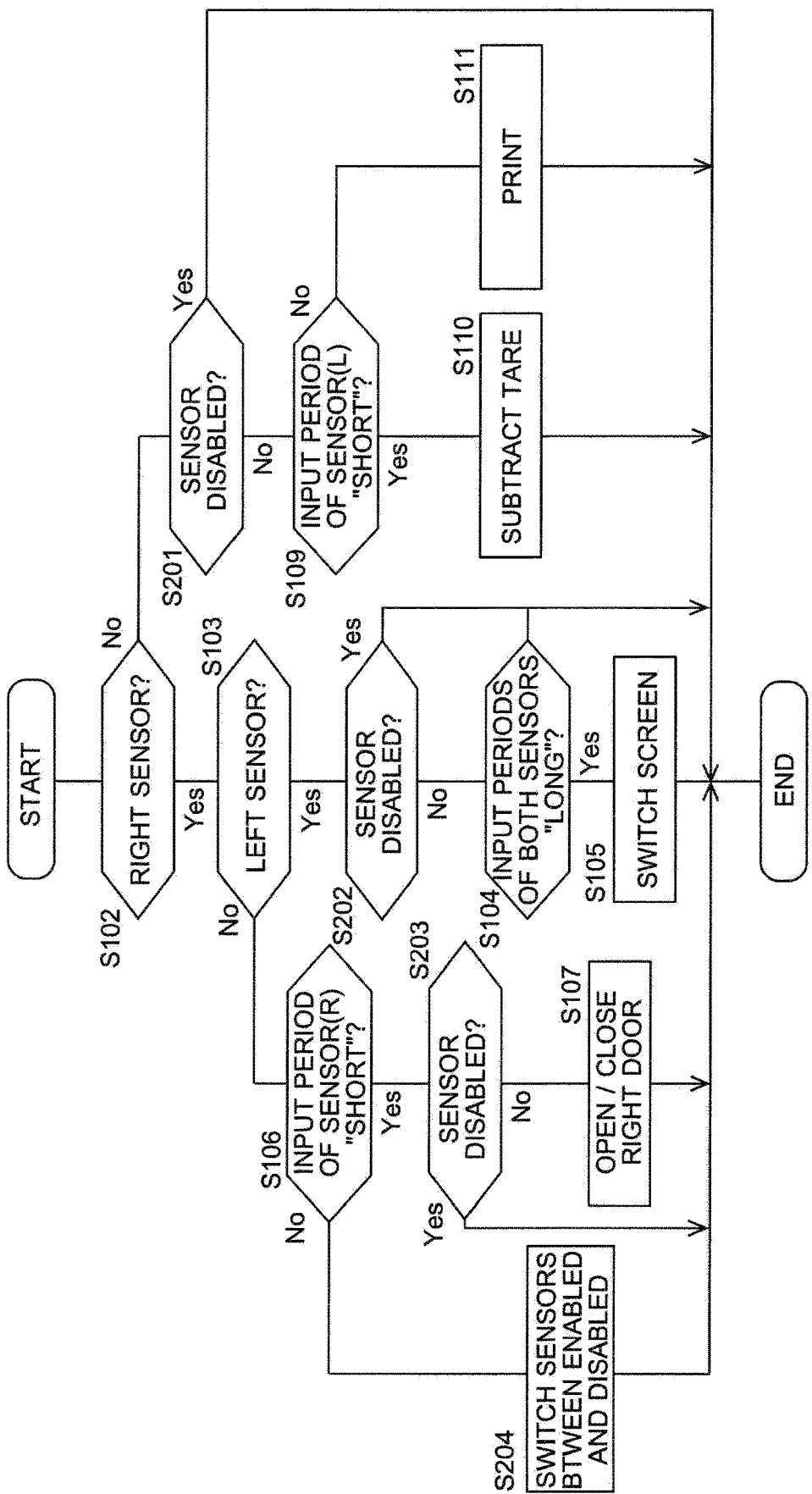
FIG. 8 is a flowchart showing the processing for another operation control using the detection signals of the non-contact sensors in the electronic balance according to the first embodiment.

FIG. 8 shows the flowchart in the case where the switching between the disabling and enabling settings of the right and left non-contact sensors 31 and 32 is performed through the right and left non-contact sensors 31 and 32. For the present case, it is assumed that the operation for "the switching between the disabling and enabling settings" is assigned to Pattern 2 in the pattern table shown in FIG. 5. As with the flowchart in FIG. 7, the present flowchart begins with an input of a detection signal from one of the right and left non-contact sensors 31 and 32 to the control unit 30.

Initially, the control unit 30 determines whether the input it has received is one detection signal from one of the right and left non-contact sensors 31 and 32 or two detection signals from both sensors (Steps 102 and 103). If the input is a detection signal from only the non-contact sensor 32 ("No" in Step 102), the control unit 30 determines whether or not the disabling setting of the right and left non-contact sensors 31 and 32 is ON. If the disabling setting is ON, the processing is immediately discontinued ("Yes" in Step 201). If the disabling setting is OFF ("No" in Step 201), the control unit 30 performs the same processing as Steps 109-111 in the flowchart of FIG. 7.

If the input is two detection signals from both the right and left non-contact sensors 31 and 32 ("Yes" in Step 102, and "Yes" in Step 103), the control unit 30 determines whether or not the disabling setting of the right and left non-contact sensors 31 and 32 is ON. If the disabling setting is ON, the processing is immediately discontinued ("Yes" in Step 202). If the disabling setting is OFF ("No" in Step 202), the control unit 30 performs the same processing as Steps 104 and 105 in the flowchart of FIG. 7.

If the input is a detection signal from only the right non-contact sensor 31 ("Yes" in Step 102, and "No" in Step 103), whether or not the input period of the detection signal is shorter than three seconds is determined. If the input period is shorter than three seconds ("Yes" in Step 106), whether or not the disabling setting of the right and left non-contact sensors 31 and 32 is ON is determined. If the disabling setting is ON, the processing is immediately discontinued ("Yes" in Step 203). If the disabling setting is OFF ("No" in Step 203), the door open-close controller 305 is instructed to perform the open-close operation of the right door 24 (Step 107). If the input period of the detection signal is not shorter than three seconds ("No" in Step 106), the disabling and enabling setting of the right and left non-contact sensors 31 and 32 is changed (Step 204). That is to say, if the disabling setting is ON, the disabling setting is turned off, and if the disabling setting is OFF, the disabling setting is turned on. Accordingly, in the present case, the user can perform the operation for disabling or enabling the right and left non-contact sensors 31 and 32 through the right and left non-contact sensors 31 and 32 themselves, without touching any portion of the electronic balance 1.

Thus, in the present embodiment, the control unit 30 does not simply determine whether or not it has received an input of detection signals from the right and left non-contact sensors 31 and 32; the state identifier 306 identifies the detection signal or signals of the right and left non-contact sensors 31 and 32 as one of the six detection patterns which are different in terms of the combination of the presence/absence of an input of each detection signal and the input period of each signal, and one of the predetermined operations assigned to those detection patterns is performed based on the identification result. Accordingly, a greater number of operations than that of the non-contact sensors (in the present example, two) can be performed using the right and left non-contact sensors 31 and 32.

Second Embodiment

Figure 9:
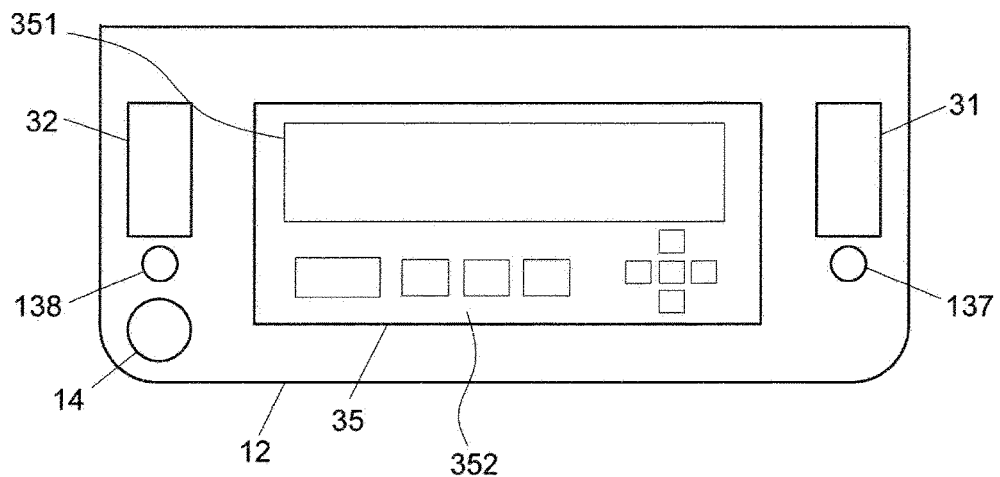
FIG. 9 is a top view of a console of an electronic balance as the second embodiment of the present invention.
Figure 10:
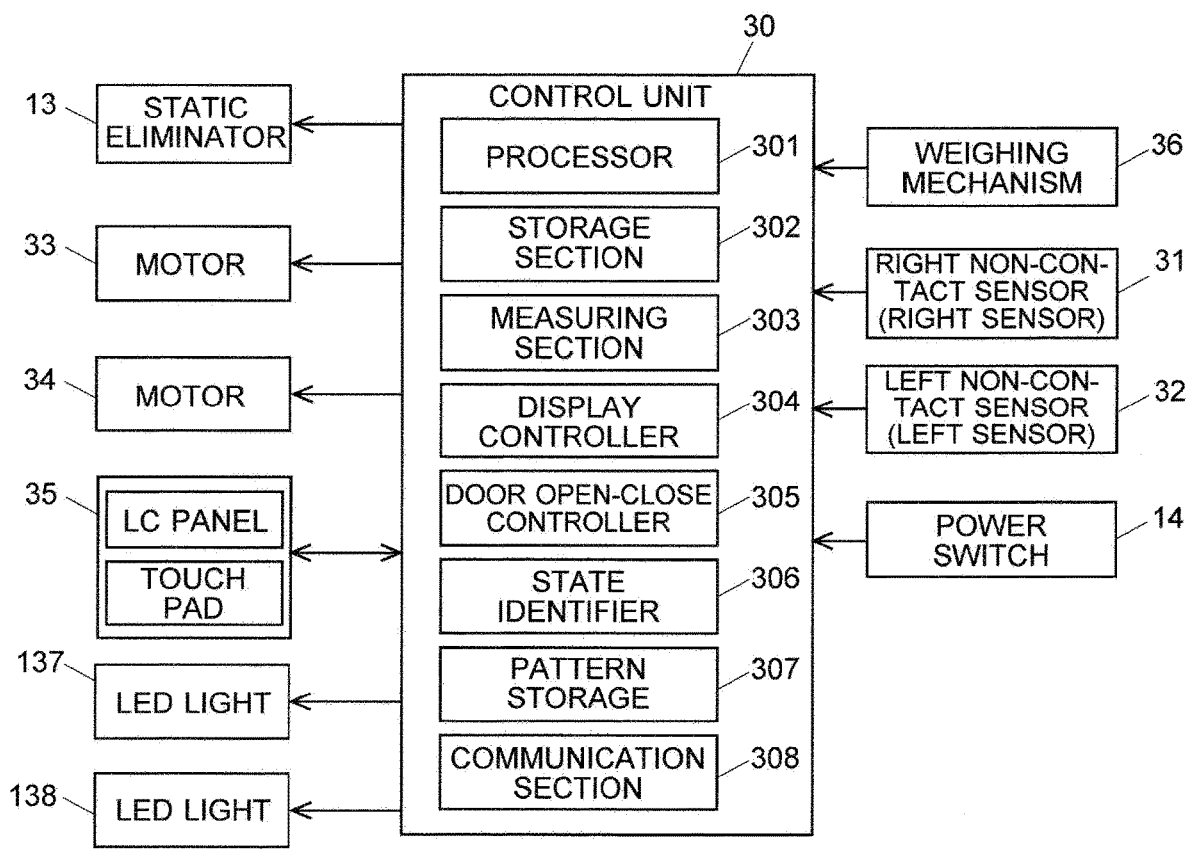
FIG. 10 is a block diagram schematically showing the main control system of the electronic balance according to the second embodiment.
Figures 11, 12:
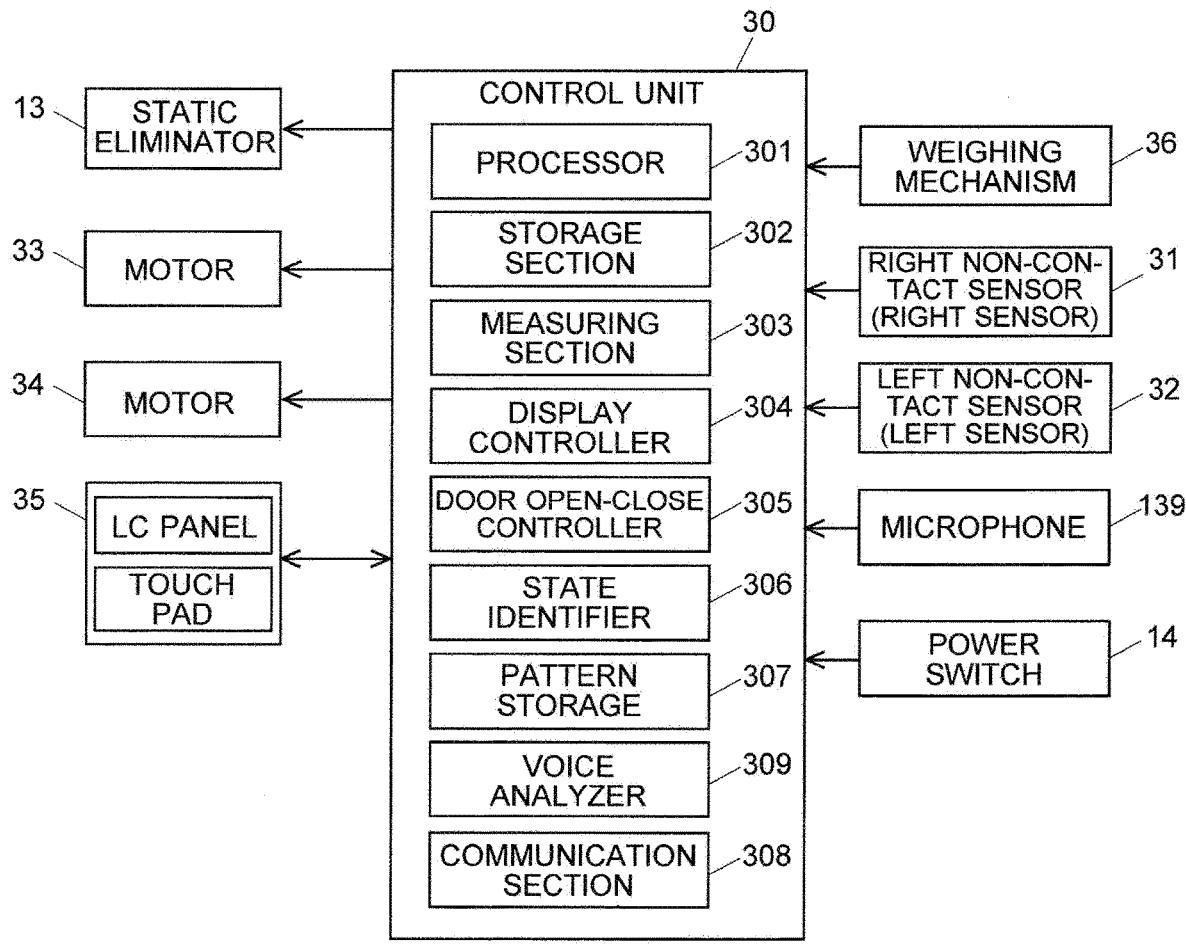
FIG. 11 is an explanatory figure of a pattern table which contains detection patterns of the non-contact sensors and the contents of the operations related to those detection patterns in the electronic balance according to the second embodiment.
FIG. 12 is a block diagram schematically showing the main control system of the electronic balance as the third embodiment of the present invention.

FIGS. 9-11 are diagrams for explaining an electronic balance according to the second embodiment of the present invention. The components which are identical or correspond to those in the first embodiment are denoted by the same reference sign, and detailed descriptions of those components will be omitted.

As shown in FIG. 9, the electronic balance 1 according to the present embodiment has light-emitting diode (LED) lights 137 and 138 attached to the console 12 at positions close to the right and left non-contact sensors 31 and 32 (below the right and left non-contact sensors 31 and 32 in FIG. 9), respectively. The LED lights 137 and 138 correspond to the informing means in the present invention and are used to inform whether or not the disabling setting of the right and left non-contact sensors 31 and 32 is ON. As shown in FIG. 10, the LED lights 137 and 138 are connected to the control unit 30 and are turned on and off by the control unit 30.

FIG. 11 shows the pattern table stored in the pattern storage section 307. In the present embodiment, the open-close operation of the right door 24 and that of the left door 25 are respectively related to the two detection patterns in which the input period of the detection signal from one of the right and left non-contact sensors 31 and 32 is shorter than three seconds (Patterns 1 and 3). Furthermore, the switching operation between the disabling and enabling settings of the right non-contact sensor 31 and the switching operation between the disabling and enabling settings of the right non-contact sensor 32 are respectively related to the two detection patterns in which the input period of the detection signal from one of the right and left non-contact sensors 31 and 32 is equal to or longer than three seconds (Patterns 2 and 4). Additionally, the screen-switching operation is related to the detection pattern in which detection signals are almost simultaneously inputted from the right and left non-contact sensors 31 and 32 to the control unit 30, and each of the input periods of those detection signals is equal to longer than three seconds (Pattern 5).

When the detection pattern of the detection signals from the right and left non-contact sensors 31 and 32 has been identified as Pattern 2 by the state identifier 306, the control unit 30 changes the enabling-disabling setting of the right non-contact sensor 31. The control unit 30 also turns on the LED light 137 when the right non-contact sensor 31 has been enabled or turns off the LED light 137 when the right non-contact sensor 31 has been disabled. Similarly, when the detection pattern of the detection signals from the right and left non-contact sensors 31 and 32 has been identified as Pattern 4 by the state identifier 306, the control unit 30 turns on the LED light 138 when the left non-contact sensor 32 has been enabled or turns off the LED light 138 when the same non-contact sensor 32 has been disabled.

The previously described configuration allows the user to open and close the right and left doors 24 and 25 using the right and left non-contact sensors 31 and 32, respectively, as well as independently change the disabling/enabling setting of each of the right and left non-contact sensors 31 and 32. The user can also look at the lighting state of the LED lights 137 and 138 to recognize the enabling and disabling setting of each of the right and left non-contact sensors 31 and 32 adjacent to those lights.

In the present example, the LED lights 137 and 138 are turned on/off according to the setting of the enabling/disabling of the right non-contact sensor 31 and/or the left and the non-contact sensor 32. As another possibility, the lighting color of the LED lights may be changed. For example, when the right non-contact sensor 31 and/or the left and the non-contact sensor 32 is enabled, the corresponding LED light or lights may be turned on in blue, while the LED light is turned on in red for a disabled non-contact sensor.

The fact that the right non-contact sensor 31 and/or the left non-contact sensor 32 is disabled may also be visually indicated in the display area 351 of the input/display section 35 by means of characters, symbols or other types of signs representing such a fact. Furthermore, a speaker may be provided so as to generate an alerting sound when the disabling/enabling setting of the right non-contact sensor 31 and/or the left non-contact sensor 32 has been changed.

Third Embodiment

FIG. 12 is a diagram for explaining the third embodiment of the present invention, showing the main control system of the electronic balance according to the present embodiment. The components which have counterparts in the block diagram of the first embodiment shown in FIG. 4 is denoted by the same reference sign, and detailed descriptions of those components will be omitted.

The electronic balance according to the present embodiment has a microphone 139 for allowing the user to give instructions to the control unit 30 by voice to perform predetermined operations, while the control unit 30 has a voice analyzer 309 configured to analyze a voice inputted through the microphone 139. In the pattern storage section 307, a voice pattern table (not shown) showing the relationship between voice patterns and the contents of the corresponding operations is stored in addition to the previously described pattern table.

When a voice input is transmitted through the microphone 139 to the control unit 30, the voice analyzer 309 analyzes that voice to determine whether or not the voice corresponds to any one of the previously set voice patterns. The analysis result is sent to the state identifier 306. The state identifier 306 compares the analyzed voice pattern with the voice patterns held in the voice pattern table and reads the content of the operation related to the voice pattern in question. The voice patterns set in the voice pattern table are comparatively simple phrases expressing the contents of specific operations, such as "disable", "enable" and "power off", to which the operation for disabling the right and left non-contact sensors 31 and 32, operation for enabling the sensors as well as power-off operation are respectively related.

For example, when the user has transmitted the voice input of "disable" through the microphone 139, and the state identifier 306 has identified the voice pattern of "disable" from the result of the analysis of that voice by the voice analyzer 309, the control unit 30 disables the right and left non-contact sensors 31 and 32.

The present embodiment employs a microphone as a non-contact sensor. This type of configuration also allows the user to instruct the electronic balance 1 to perform predetermined operations, without touching the console 12 (or other portions) of the electronic balance 1 or physically performing input operations on the console 12.

Fourth Embodiment

Figure 13:
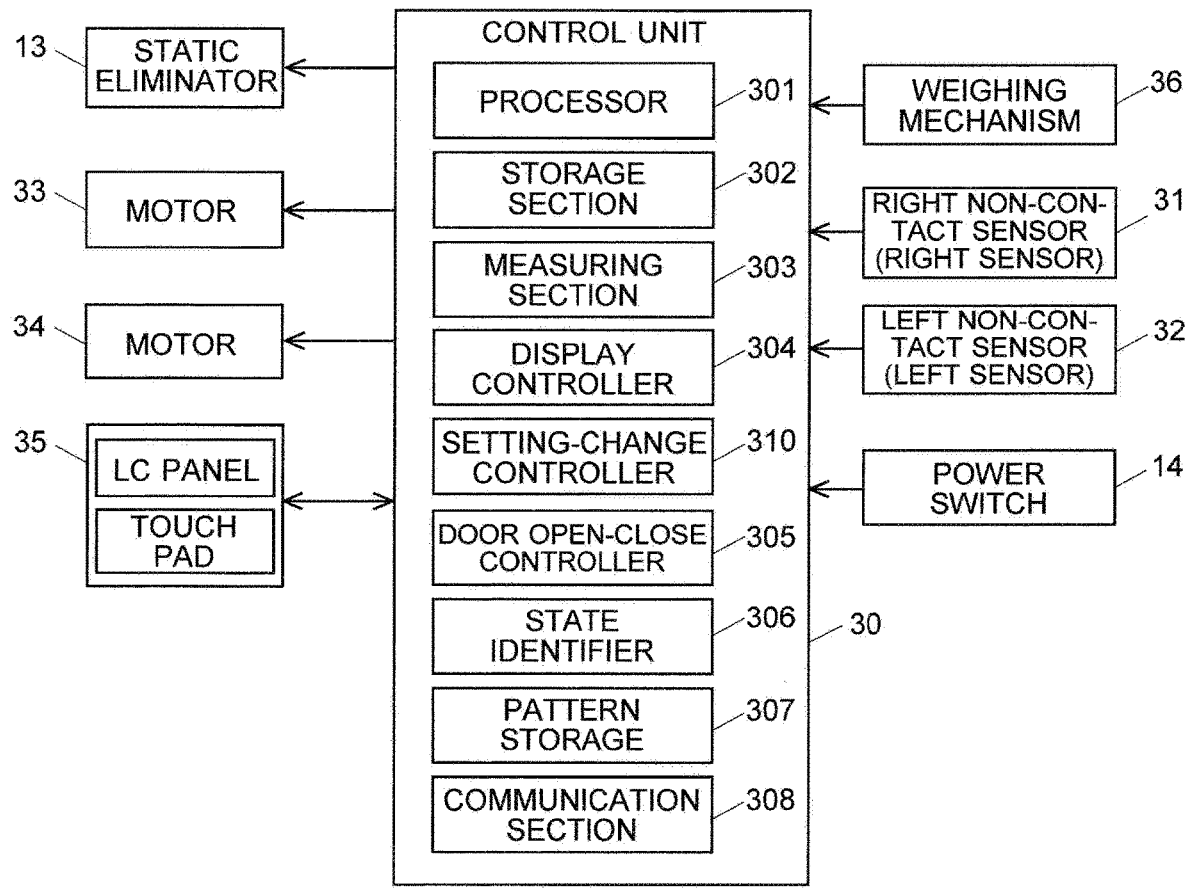
FIG. 13 is a block diagram schematically showing the main control system of the electronic balance as the fourth embodiment of the present invention.

FIGS. 13-17 are diagrams for explaining an electronic balance according to the fourth embodiment of the present invention. FIG. 13 shows the main control system of the electronic balance according to the fourth embodiment. The components which are identical or correspond to those of the first embodiment shown in FIG. 4 are denoted by the same reference sign, and detailed descriptions of those components will be omitted. In the electronic balance 1 according to the present embodiment, the control unit 30 includes a setting-change processor 310 in addition to the functional blocks of the control unit 30 in the first embodiment. Details of the setting-change processor 310 will be described later. Additionally, as will be hereinafter described, the display controller 304 performs a control for displaying a screen characteristic of the fourth embodiment on the display area 351.

Figure 14A:
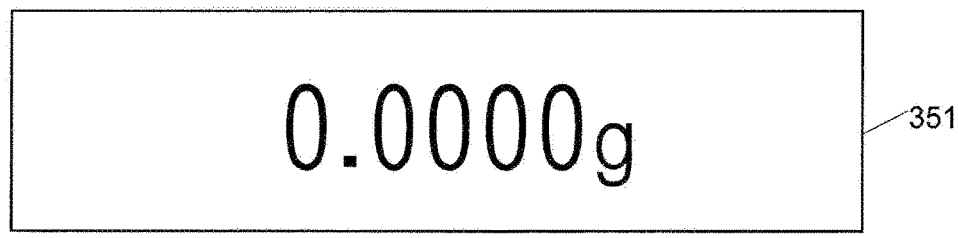
FIG. 14A is a diagram showing an example of a measured-value display screen to be displayed in the display area of the input/display section in the electronic balance according to the fourth embodiment.
Figure 14B:
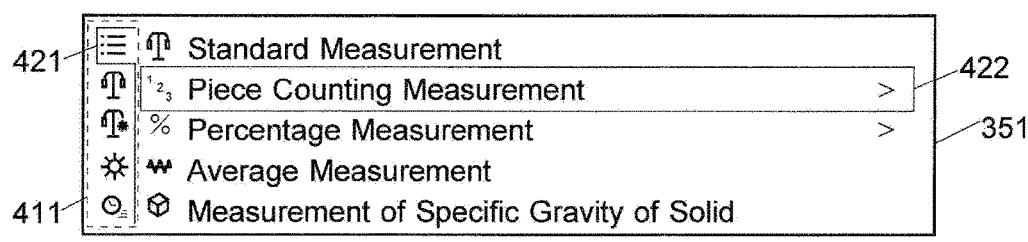
FIG. 14B is a diagram showing an example of a setting screen to be displayed in the display area of the input/display section in the electronic balance according to the fourth embodiment.
Figure 14C:
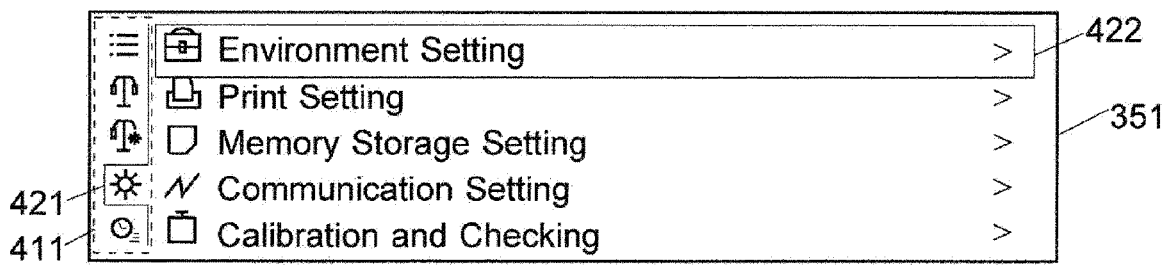
FIG. 14C is a diagram showing another example of the setting screen to be displayed in the display area of the input/display section in the electronic balance according to the fourth embodiment.

FIGS. 14A-14F show examples of the display on the display area 351 in the electronic balance according to the fourth embodiment. FIG. 14A is the measured-value display screen to be displayed in the measurement of the weight of a sample. FIGS. 14B and 14C are examples of the setting screen to be displayed in the process of changing or modifying the setting of the operation of each related section of the electronic balance. The measured-value display screen is identical to the one described in the first embodiment (FIG. 3A). As for the setting screen, there are a plurality of previously prepared screens other than the examples shown in FIGS. 14B and 14 C. The user can change the display among those plurality of screens by performing operational actions using the right and left non-contact sensors 31 and 32 as will be described later.

The setting screen has setting items organized in a hierarchical form. At the first level, there are five prepared setting items: "selection of measurement mode", "setting of each measurement mode", "general setting of measurement", "system setting" and "display of history" (it should be noted that the "display of history" setting item has actually no items to be set by the user; it merely shows predetermined pieces of information). Five first-level icons 411 which respectively correspond to the five setting items at the first level are vertically arrayed at the left end of the display areas 351. One of the five setting items can be selected by specific operational actions using the right and left non-contact sensors 31 and 32, as will be described later. FIG. 14B shows the state in which the "selection of measurement mode" icon, which is the uppermost icon among the first-level icons 411, is selected by a first selection cursor 421. FIG. 14C shows the state in which the "system setting" icon, which is the fourth icons from the top among the first-level icons 411, is selected by the first selection cursor 421.

The second level provides a plurality of setting items for each item selected at the first level. In FIG. 14B, five options are displayed as the options in the "selection of measurement mode" of the first level, i.e., "standard measurement", "piece counting measurement", "percentage measurement", "average measurement" and "measurement of specific gravity of solid", among which the "piece counting measurement" option is highlighted by a second selection cursor 422. The "standard measurement" is a measurement mode in which the measured value is directly displayed on the measured-value display screen. The "piece counting measurement" is a measurement mode in which the number obtained by dividing the measured value by a separately entered unit-weight value is displayed. The "percentage measurement" is a measurement mode in which the mass percentage obtained by dividing the measured value by a separately entered reference mass is displayed. The "average measurement" is a measurement mode in which a time average of the measured value is displayed in the case of measuring the weight of a small active animal or similar specimen. The "measurement of specific gravity of solid" is a measurement mode in which the weight of a sample is measured in the air as well as in a liquid, and the specific gravity of the sample is calculated and displayed. The user can move the second selection cursor 422 and select one item to execute the selected operation by specific operational actions using the right and left non-contact sensors 31 and 32, as will be described later. When the "piece counting measurement" or "percentage measurement" option is selected, the setting items at the third level for entering the unit-weight value or reference mass of the sample is displayed in the display area 351 (not shown). The greater-than symbol (>) at the right end of the display area 351 in FIG. 14B indicates that the third level is provided under the second-level item shown on the left side.

In FIG. 14C, five options are displayed as the options in the "system setting" of the first level, i.e., "environment setting", "print setting", "memory storage setting", "communication setting" and "calibration and checking", among which the "environment setting" option is highlighted by the second selection cursor 422. All of these five options have setting items prepared at the third level.

Figure 14D:
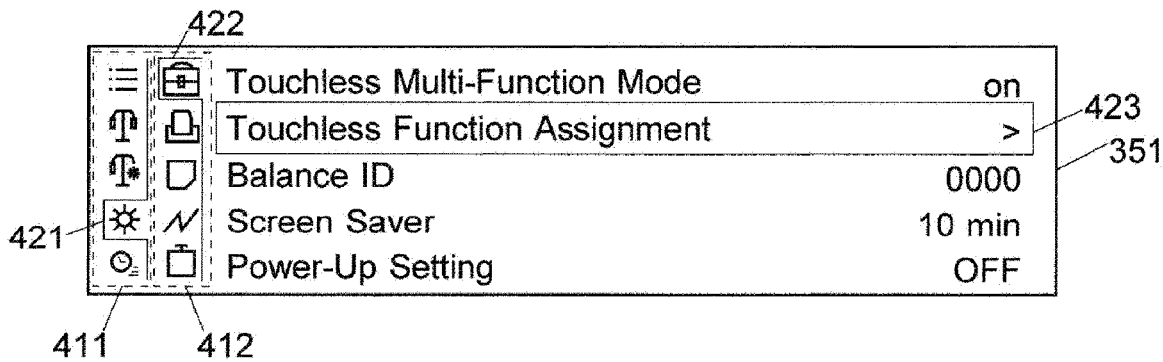
FIG. 14D is a diagram showing still another example of the setting screen to be displayed in the display area of the input/display section in the electronic balance according to the fourth embodiment.
Figure 14E:
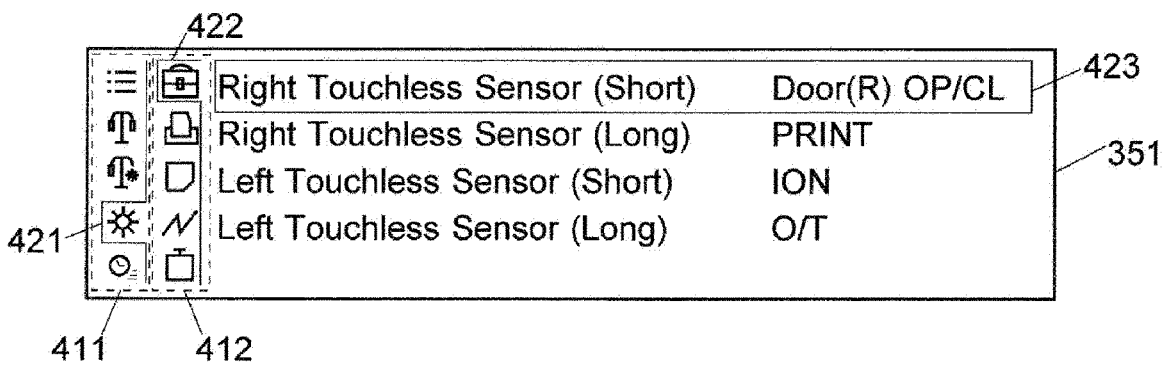
FIG. 14E is a diagram showing still another example of the setting screen to be displayed in the display area of the input/display section in the electronic balance according to the fourth embodiment.

Selecting the "environment setting" option in FIG. 14C displays an image in which the setting items at the third level are described as shown in FIG. 14D. In this image, the five setting items at the second level are shown only by the second-level icons 412, with the second selection cursor 422 set on the icon corresponding to the "environment setting" option among the five second-level icons 412. By operating the right non-contact sensor 31 in a specific manner (which will be described later), the user can set a cursor (third selection cursor 423) at one of the setting items at the third level and perform a selecting operation to display the setting items at the fourth level as shown in FIG. 14E. Details of the setting items shown in FIG. 14E will be described later.

In the present embodiment, a maximum of five items can be simultaneously displayed in the display area 351. This number may be four or less, or five or more. The display area 351 may additionally be configured to simultaneously display a maximum of five (or any other number of) items, while allowing the second selection cursor 422 to be moved further downward from the bottommost item to display other items.

Next, referring to FIG. 15, a method for setting various functions of the electronic balance 1 by operational actions using the right and left non-contact sensors 31 and 32 is described. FIG. 15 shows an example of the pattern table stored in the pattern storage section 307. In the present embodiment, even when the same operational action is performed against the right non-contact sensor 31 and/or the left non-contact sensor 32, the operation to be performed by each related section of the electronic balance in response to that action changes depending on whether the measured-value display screen or the setting screen is displayed. Therefore, the operations of the related sections of the electronic balance shown in FIG. 15 are divided into two situations in which those two screens are respectively displayed. It should be noted that, as will be described later, the present embodiment allows the user to perform specific operations on the setting screen to change some of the settings of the operations which should be performed by the related sections in response to the operational actions against the right and left non-contact sensors 31 and 32 when the measured-value display screen is displayed. Therefore, Patterns 1-4 described in FIG. 15 for the situation in which the measured-value display screen is displayed are mere examples of the operations to be performed by the electronic balance when a short-holding or long-holding action is performed against only one of the right and left sensors (right and left non-contact sensors 31 and 32). The operation to be performed when a long-holding action is simultaneously performed against both the right and left sensors (Pattern 5 in FIG. 15), i.e., the switching operation between the measured-value display screen and the setting screen, is fixed and unchangeable regardless of whether the measured-value display screen or the setting screen is displayed. The operations to be performed when the setting screen is displayed (Patterns 1-5) are also unchangeable.

Suppose that the measured-value display screen shown in FIG. 14A is initially displayed. In this situation, if the user simultaneously performs a long-holding action against both the right and left non-contact sensors 31 and 32 (Pattern 5, which corresponds to the "first detection pattern", which will be described later), the state identifier 306 identifies the pattern of this operational action based on the detection signals inputted from the right and left non-contact sensors 31 and 32. The display controller 304 receives the identification result and switches the screen shown in the display area 351 from the measured-value display screen to the setting screen.

In the setting screen, the icon of the "selection of measurement mode" is initially selected as the first level by the first selection cursor 421 among the first-level icons 411. On the right side of the first-level icons 411, the options in the "selection of measurement mode" are displayed, i.e., "standard measurement", "piece counting measurement", "percentage measurement", "average measurement" and "measurement of specific gravity of solid" (FIG. 14B, although the second selection cursor 422 is not shown yet in this stage).

In the case of setting an item different from the "selection of measurement mode" at the first level, the user performs a short-holding action against the right non-contact sensor 31 (Pattern 1) one time. This action makes the first selection cursor 421 move down to the next icon among the first-level icons 411. Performing the short-holding action against the right non-contact sensor 31 multiple times makes the first selection cursor 421 move down the same number of times. For example, if the short-holding action against the right non-contact sensor 31 is performed three times from the initial state, the display will be as shown in FIG. 14C. After the first selection cursor 421 has reached the bottommost icon which is the last option, if the short-holding action against the right non-contact sensor 31 is once more performed, the first selection cursor 421 will move to the topmost icon.

After selecting one of the items at the first level by the previously described operational action, the user performs a long-holding action against the right non-contact sensor 31 (Pattern 2). The state identifier 306 identifies the pattern of this operational action based on the detection signal inputted from the right non-contact sensor 31. The selection at the first level is thereby fixed, and the operation proceeds to the selection of an option at the second level.

The display controller 304 shows the second selection cursor 422 on the topmost option among the five options displayed on the right side of the first-level icons 411 in the display area 351 (in FIG. 14B, the "standard measurement"). In this situation, every time the user performs a short-holding action against the right non-contact sensor 31 (Pattern 1) the second selection cursor 422 moves down to the next option (FIG. 14B shows the situation in which the second selection cursor 422 has moved to the "piece counting measurement"). After the second selection cursor 422 has reached the bottommost option, if the short-holding action against the right non-contact sensor 31 is once more performed, the second selection cursor 422 will move to the topmost option.

After setting the second selection cursor 422 at the desired option by the previously described operation, the user performs a long-holding action against the right non-contact sensor 31 one time (Pattern 2, which corresponds to the "second detection pattern", which will be described later). The state identifier 306 identifies the pattern of this operational action based on the detection signal inputted from the right non-contact sensor 31. If the selected option has no setting at the third level (as with the "standard measurement" option in FIG. 14B, for example), the selection is fixed, and the setting-change processor 310 sets the operation of the electronic balance specified in the selected option. If the option selected at the second level has the setting at the third level, the display controller 304 shows the options at the third level and the third selection cursor 423 (FIG. 14D). Subsequently, an option at the third level can be selected in a similar manner to the operation performed at the second level. The same also applies to the fourth and subsequent levels if these levels are present.

After the selection for an option has been completed at the second and lower levels, the second selection cursor 422 can be moved to another option by a short-holding action against the right non-contact sensor 31, and this new option can be selected by a long-holding action against the right non-contact sensor 31 to perform the setting for the new option. After the selection for an option has been completed, or when it is necessary to move to the higher level (e.g., from the second to the first level, or from the third to the second level) in order to change the option for which the selection should be made, the user can move to the higher level by performing a short-holding action against the left non-contact sensor 32 one time.

After the setting tasks for all of the intended options have been completed, the user simultaneously performs a long-holding action against both the right and left non-contact sensors 31 and 32 (Pattern 5: the first detection pattern). Then, the state identifier 306 identifies the pattern of this operational action based on the detection signals inputted from the right and left non-contact sensors 31 and 32. Based on the identification result, the display controller 304 switches the screen shown in the display area 351 from the setting screen to the measured-value display screen. The entire setting operation is thereby completed, and the device is ready for the measurement of the weight a sample.

The fourth embodiment further allows the setting of the operations assigned to the right and left non-contact sensors 31 and 32 as one of the settings of the related sections of the electronic balance performed using the non-contact sensors. For the setting of the operations assigned to these non-contact sensors, the user should perform the previously described operational actions against the right non-contact sensor 31 (and the left non-contact sensor 32, when necessary) to sequentially select the "system setting" at the first level (the fourth icon from the top among the first-level icons 411), the "environment setting" at the second level, and the "touchless function assignment" at the third level (FIG. 14D) to display the screen of the fourth level as shown in FIG. 14E.

Figure 14F:
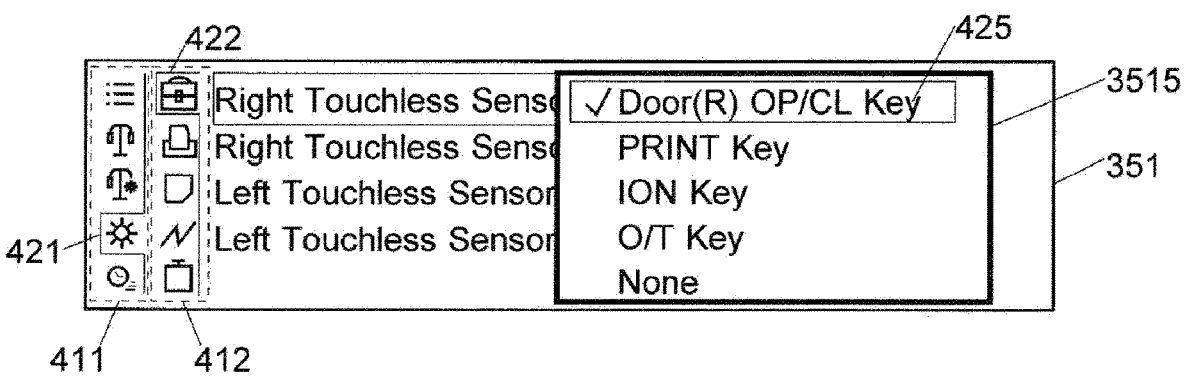
FIG. 14F is a diagram showing still another example of the setting screen to be displayed in the display area of the input/display section in the electronic balance according to the fourth embodiment.

There are four setting items prepared on the screen of the fourth level: "right touchless sensor (short)", "right touchless sensor (long)", "left touchless sensor (short)" and "left touchless sensor (long)". Each of these setting items allows for the setting of what operation should be performed by a component of the electronic balance 1 when a short-holding action has been performed against the right touchless sensor, when a long-holding action has been performed against the right touchless sensor, when a short-holding action has been performed against the left touchless sensor, or when a long-holding action has been performed against the left touchless sensor. After selecting one setting item (e.g., "right touchless sensor (short)") from these four setting items by a short-holding action against the right non-contact sensor (Pattern 1), the user performs a long-holding action against the right non-contact sensor 31. Then, as shown in FIG. 14F, a screen 3515 of the fifth level is superposed on a portion of the screen of the fourth level.

The screen 3515 of the fifth level shows five options: "door open-close key (right)", "PRINT key", "O/T key", "ION key" and "none". It should be noted that it is when the "right touchless sensor (short)" or "right touchless sensor (long)" is selected at the fourth level that the "door open-close key (right)" is shown at the fifth level. When the "left touchless sensor (short)" or "left touchless sensor (long)" is selected at the fourth level, the "door open-close key (left)" will be selected in place of the "door open-close key (right)" at the fifth level. The "PRINT key", "O/T key" and "ION key" are keys to be used for printing data, performing the tare subtraction, and turning on/off the static eliminator 13, respectively. "None" means that an operational action against the non-contact sensor selected at the fourth level will not trigger any operation.

When the screen 3515 of the fifth level is displayed, the user performs a short-holding action against the right touchless sensor (Pattern 1) a required number of times to set the fifth-level cursor 425 at the function that should be assigned to the operational action against the non-contact sensor selected at the fourth level (e.g., "right touchless sensor (short)"). In this state, the user performs a long-holding action against the right non-contact sensor 31 (Pattern 2). The function highlighted by the cursor 425 at the fifth level is thereby assigned to the operational action against the non-contact sensor selected at the fourth level. After performing a similar processing for all types of operational actions against the non-contact sensors to which some functions should be assigned, the user simultaneously performs a long-holding action against both the right and left non-contact sensors 31 and 32 (Pattern 5), whereby the screen displayed in the display area 351 is switched from the setting screen to the measured-value display screen, and the entire setting operation is completed.

Figure 16:
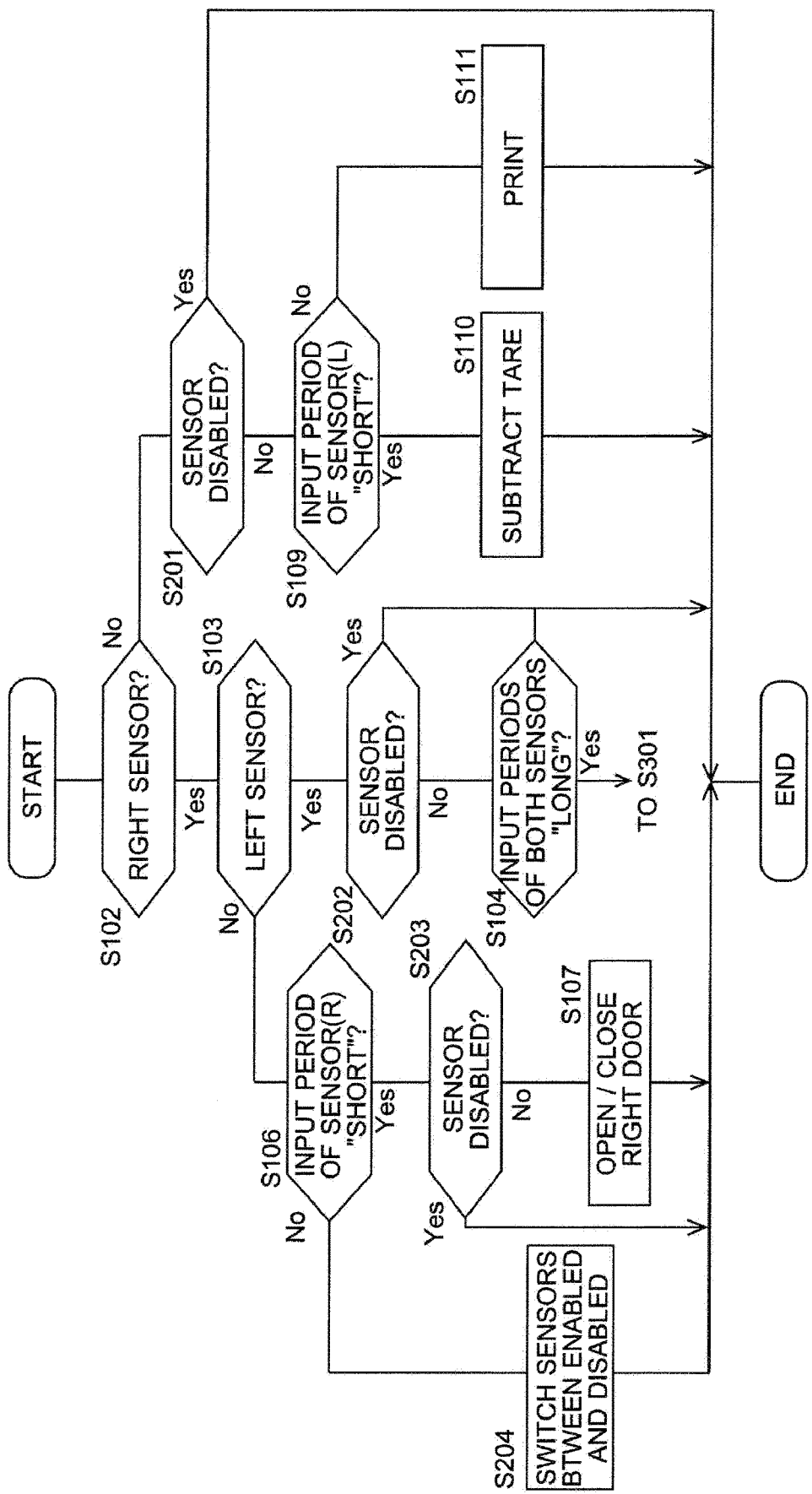
FIG. 16 is a flowchart showing a portion of the processing for an operation control using the detection signals of the non-contact sensors in the electronic balance according to the fourth embodiment.
Figure 17:
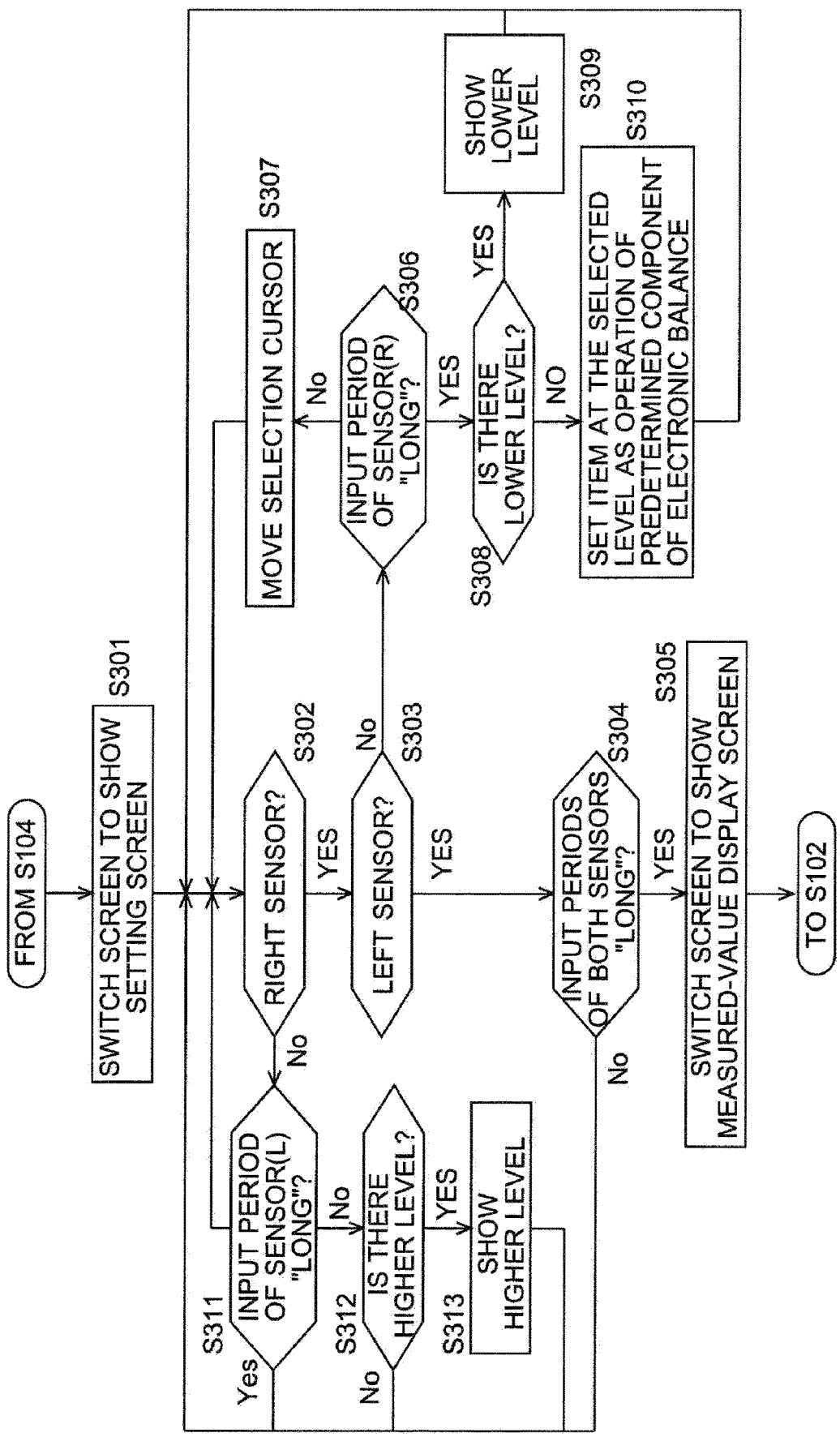
FIG. 17 is a flowchart showing the remaining portion of the processing for an operation control using the detection signals of the non-contact sensors in the electronic balance according to the fourth embodiment.

The operation of the electronic balance according to the fourth embodiment described to this point is performed according to the flowchart shown in FIGS. 16 and 17. In advance of a detailed description of the flowchart, the relationship between FIGS. 16 and 17 should be explained: If the determination result in Step 104 in the flowchart of FIG. 16 is "YES", the operation transitions to the starting point of the flowchart of FIG. 17. If the determination result in Step 304 in the flowchart of FIG. 17 is "YES", the operation transitions to Step 102 in the flowchart of FIG. 16 after Step 305 is performed.

The operation is initially performed according to the flowchart of FIG. 16. The operation performed according to the flowchart of FIG. 16 is similar to that of the electronic balance according to the first embodiment described in the flowchart of FIG. 8 except for the following differences, and therefore, descriptions of the operations other than those differences will be omitted. The first difference exists in that, when a long-holding action is simultaneously performed against both the right and left non-contact sensors 31 and 32 in Step 104, the operation transitions to the flowchart of FIG. 17, as noted earlier. The second difference exists in that the operations of the electronic balance assigned to Steps 104, 107, 110 and 111 are fixed (unchangeable) in the first embodiment, whereas the fourth embodiment allows the user to change those operations by making appropriate actions against the right and left non-contact sensors 31 and 32, as described earlier. It should be noted that these operations noted as the differences may be combined with the operations in the first embodiment shown in the flowchart of FIG. 7 or the operations in the second or third embodiment.

After the transition from Step 104 to the flowchart of FIG. 17, the display controller 304 initially switches the screen displayed in the display area 351 from the measured-value display screen to the setting screen (Step 301). The state identifier 306 subsequently determines whether or not there has been an input of a detection signal from the right non-contact sensor 31 (Step 302). If the result is "Yes" (there has been an input), the state identifier 306 further determines whether or not there has been an input of a detection signal from the left non-contact sensor 32 (Step 303).

If the result of Step 302 is "Yes" and that of Step 303 is also "Yes", it is determined whether or not the detection signals from both the right and left non-contact sensors 31 and 32 have been inputted for a period of time equal to or longer than a predetermined length (Step 304). If the determination result in this step is "YES", it means that a long-holding action has been performed against both the right and left non-contact sensors 31 and 32, so that the display controller 304 switches the screen displayed in the display area 351 from the setting screen to the measured-value display screen (Step 305), and the operation returns to Step 102 in the flowchart of FIG. 16. If the determination result in Step 304 is "No", it means that a short-holding action has been performed against both the right and left non-contact sensors 31 and 32. Since this operational action has no function assigned when the setting screen is displayed, this action is disregarded, and the operation returns to Step 302.

If the result of Step 302 is "Yes" and that of Step 303 is "No", i.e., when there has been an input of a detection signal from the right non-contact sensor 31 while there has been no input of a detection signal from the left non-contact sensor 32, it is determined whether or not the detection signal from the right non-contact sensor 31 has been inputted for a period of time equal to or longer than a predetermined length (Step 306). If the determination result in this step is "No", it means that a short-holding action has been performed against the right non-contact sensor 31, so that the display controller 304 performs the operation of moving the cursor displayed on the current screen down to the next option (Step 307), and the operation returns to Step 302. If the determination result in Step 306 is "Yes", it means that a long-holding action has been performed against the right non-contact sensor 31, so that the setting-change processor 310 determines whether or not there is a screen of the subsequent level related to the item currently selected by the cursor (Step 308). If the determination result in Step 308 is "Yes", the display controller 304 performs the operation of displaying an image of the subsequent level (Step 309), and the operation returns to Step 302. If the determination result in Step 308 is "NO", the item currently selected by the cursor is set as the operation of a predetermined component of the electronic balance (Step 310), and the operation returns to Step 302.

If the result in Step 302 is "No", it is determined whether or not the detection signal from the left non-contact sensor 32 has been inputted for a period of time equal to or longer than a predetermined length (Step 311). If the determination result in this step is "No", it means that a short-holding action against the left non-contact sensor 32 has been performed. In that case, the display controller 304 determines whether or not there is an image of a level which is higher than the currently shown image (Step 312). If the result is "Yes", the display controller 304 shows the image of the level which is one level higher (Step 313), and the operation returns to Step 302. If the determination result in Step 312 is "No", the operation directly returns to Step 302. If the determination result in Step 311 is "Yes", it means that a long-holding action has been performed against the left non-contact sensor 32. Since this operational action has no function assigned when the setting screen is displayed, this action is disregarded, and the operation returns to Step 302.

As described to this point, when an operational action other than the long-holding action against both the right and left non-contact sensors 31 and 32 has been performed, the predetermined processing is performed, and the operation returns to Step 302 to wait for the next operational action against the non-contact sensors. When the long-holding action against both the right and left non-contact sensors 31 and 32 has been performed, the display is switched from the setting screen to the measured-value display screen (Step 305), and the operation transitions to Step 102 in the flowchart of FIG. 16. From this state, the operations assigned to the combinations of the right and left non-contact sensors 31 and 32 can be performed.

The electronic balance according to the fourth embodiment allows the user to perform not only the open-close operation of the doors but also the setting of the operations of predetermined sections of the electronic balance through the non-contact sensors. Therefore, it is unnecessary to provide a non-contact sensor for the setting operation apart from the non-contact sensor for the open-close operation of the doors, so that the installation space of the non-contact sensors can be decreased, and the cost of the sensors can also be reduced. Furthermore, since there is no need to physically touch the electronic balance by hand for the setting operation, the electronic balance is prevented from being contaminated with chemicals or similar substances sticking to the hands of the user. Even if one of the users might have been infected with an infectious disease, the contagion to other users via the electronic balance could be avoided. Additionally, the user can also perform the setting of the operation of the non-contact sensors by performing operational actions against the non-contact sensors themselves.

The present invention is not limited to the previously described embodiments. It can be changed in various forms within the gist of the present invention.

For example, although all of the previously described embodiments are examples of the electronic balance having a plurality of non-contact sensors, the present invention can also be embodied with a single non-contact sensor. For example, Patterns 1 and 2 shown in the pattern table of FIG. 5 are detection patterns of a detection signal from only the right non-contact sensor 31. From this fact, it is evident that a plurality of detection patterns and corresponding operations can be set even when there is only a single non-contact sensor.

In the previously described embodiments, it is determined whether the period of time of the hand-holding action against each of the right and left non-contact sensors 31 and 32 is a short or long period. However, in the case of a predetermined operation assigned to the very fact that a person's hand has been held against the right non-contact sensor 31 and/or the left non-contact sensor 32, it is unnecessary to determine whether or not the hand-holding period is a short or long period. In this case, the state identifier 306 performs a predetermined operation assigned to the non-contact sensor 31 or 32, for example, by detecting the rising edge of the detection signal as shown in FIG. 6.

[Modes]

A person skilled in the art can understand that the previously described illustrative embodiments are specific examples of the following modes.

(Clause 1) An electronic balance includes:
- a non-contact sensor configured to detect an object;
- a state identifier configured to identify a time pattern of a detection signal of the non-contact sensor as one of a plurality of previously defined time patterns; and
- an operation controller configured to control an operation of a predetermined section of the electronic balance related to the time pattern identified by the state identifier.

In the electronic balance according to Clause 1, the detection signal of the non-contact sensor is sent to the state identifier, and the time pattern of the detection signal is identified as one of the plurality of previously defined time patterns. The state identifier detects a time pattern based on this detection signal from the non-contact sensor and identifies that time pattern as one of the plurality of previously defined time patterns. For example, the time patterns can be defined so as to classify detection signals based on the period of time of the output of the detection signal from the non-contact sensor (or period of time of the input of the detection signal to the state identifier), or based on the number of times of the output (or number of times of the input) of the detection signal within a predetermined period of time. Therefore, in the electronic balance according to Clause 1, an appropriate type of non-contact sensor for the content of the time pattern is used. That is to say, in the case of the time pattern based on the difference in the duration of the detection signal, a type of non-contact sensor which continuously produces a detection signal while an object is being detected is used. In the case of the time pattern based on the number of times of the output of the detection signal, a type of non-contact sensor which produces a detection signal for each detection of an object is used.

The operation controller makes a predetermined section of the electronic balance perform an operation related to one of the time patterns depending on the result of the identification by the state identifier. Accordingly, in the electronic balance according to Clause 1, a greater number of operation than that of the non-contact sensors can be performed based on the detection signals of the non-contact sensors. In this case, the number of non-contact sensors may be one, two or even more. When there are a plurality of non-contact sensors, the time patterns to be detected may include not only time patterns each of which is formed by a detection signal from an individual non-contact sensor but also time patterns each of which is formed by a combination of detection signals from a plurality of non-contact sensors.

(Clause 2) In the electronic balance according to Clause 1, the state identifier may be configured to identify the time pattern as one of the plurality of previously defined time patterns based on at least one of the following periods of time in the detection signal of the non-contact sensor: the period of time from the rising edge to the falling edge, the period of time from the falling edge to the rising edge, the period of time from the rising edge, and the period of time from the falling edge.

In the electronic balance according to Clause 2, the detection signals produced by the non-contact sensor can be classified into different time patterns, for example, according to the period of time of a hand-holding action against the non-contact sensor, number of times of the hand-holding action, or a combination of these two values. Examples of the non-contact sensor which produces detection signals with different time patterns according to the period of time or number of times of the hand-holding action against the non-contact sensor include a reflective photosensor and pyroelectric infrared sensor.

(Clause 3) The electronic balance according to Clause 1 or 2 may further include a windshield surrounding a measuring pan and having a door that can be opened and closed, as well as a motor configured to drive the door to open and close, where the operation of the predetermined section related to the time patterns is an operation of the motor.

In the electronic balance according to Clause 3, the door open-close operation, which is one of the necessary operations for measuring the weight of a sample, can be performed through the non-contact sensor.

(Clause 4) The electronic balance according to one of Clauses 1-3 may further include a display controller configured to allow for the switching of a display on a display section between a first display screen configured to show a measured value of the sample, and a second display screen configured to show the plurality of time patterns and the contents of the operations of the predetermined section respectively related to the plurality of time patterns, where the operation of the predetermined section related to the time patterns is an operation of the display controller.

In the electronic balance according to Clause 4, the display section on which the measured value of the sample is to be shown can be used to display the second display screen which shows the contents of the operations related to the time patterns of the detection signal of the non-contact sensor, thereby allowing the user to check those contents.

(Clause 5) The electronic balance according to one of Clauses 1-3 may further include:

a display controller configured to allow for the switching of a display on a display section between a measured-value display screen configured to show a measured value of the sample, and a setting screen configured to show an item for setting the operation of the predetermined section of the electronic balance, where the display controller performs a control for the switching between the measured-value display screen and the setting screen when the state identifier recognized a first predetermined time pattern which is one of the plurality of time patterns; and a setting-change processor configured to perform a processing for changing the setting of the operation of the predetermined section when the state identifier recognized a second predetermined time pattern which is one of the plurality of time patterns in a situation in which the setting screen is displayed on the display section.

In the electronic balance according to Clause 5, when the state identifier has recognized the first predetermined time pattern (which is different from the time pattern for the open-close operation of the door) as a result of a first predetermined action (which is different from the operational action for the open-close operation of the door) performed by the user against the non-contact sensor, the display controller switches the screen displayed on the display section between the measured-value display screen and the setting screen. In the situation in which the setting screen has been displayed by this action, when the state identifier has recognized the second predetermined time pattern (which is different from the time pattern for the open-close operation of the door as well as the first predetermined time pattern) as a result of a second predetermined action (which is different from the operational action for the open-close operation of the door as well as the first predetermined action) performed by the user against the non-contact sensor, the setting-change processor performs a processing for changing the setting of the operation of the predetermined section of the electronic balance (the "predetermined section" in this context is not always a section whose operation is initiated through the non-contact sensor).

Examples of the setting items to be displayed on the setting screen and changed by the setting-change processor include the measurement mode setting (e.g., standard measurement, piece counting measurement, percentage measurement and average measurement), measurement setting (e.g., settings concerning the tare subtraction, and change of the unit), environment setting (e.g., date-and-time setting, LED light brightness, setting of whether or not a buzzer sound should be produced when the non-contact sensor is operated), and print setting.

The electronic balance according to Clause 5 allows the user to perform not only the open-close operation of the doors but also the setting of the operations of predetermined sections of the electronic balance through the non-contact sensor. Therefore, it is unnecessary to provide a non-contact sensor for the setting operation apart from the non-contact sensor for the open-close operation of the doors, so that the installation space of the non-contact sensor can be decreased, and the cost of the sensor can also be reduced. Furthermore, since there is no need to touch the electronic balance by hand for the setting operation, the electronic balance is prevented from being contaminated with chemicals or similar substances sticking to the hands of the user. Even if one of the users should have been infected with an infectious disease, the contagion to other users via the electronic balance could be avoided.

It should be noted that the electronic balance according to Clause 5 may be configured to use the non-contact sensor for only the setting of operations and not for an operation of the electronic balance (other than the setting of the operation of the predetermined section), such as the open-close operation of the door.

(Clause 6) In the electronic balance according to Clause 5, the operation of the predetermined section for which the processing for changing the setting is performed by the setting-change processor may be an operation of the non-contact sensor.

The electronic balance according to Clause 6 allows the user to perform the setting of the operation of the non-contact sensor by performing operational actions against the non-contact sensor itself.

For example, in the case where the electronic balance has two non-contact sensors called a "first non-contact sensor" and a "second non-contact sensor", the user can perform six types of operational actions as follows: (1) a short-holding action against the first non-contact sensor, (2) a long-holding action against the first non-contact sensor, (3) a short-holding action against the second non-contact sensor, (4) a long-holding action against the second non-contact sensor, (5) a simultaneous long-holding action against both the first and second non-contact sensors, and (6) a simultaneous short-holding action against both the first and second non-contact sensors. Suppose that one of these actions (e.g., (5)) is the first predetermined action and another one is the second predetermined action. The user can perform the first predetermined action to display the setting screen and then perform the second predetermined action to do the setting of the assignment of the operations to the four other actions among the six aforementioned actions, exclusive of the first and second predetermined actions.

(Clause 7) The electronic balance according to one of Clauses 1-6 may include a storage section for storing a pattern table which holds the plurality of time patterns and the operations of the predetermined section respectively related to the time patterns.

In the electronic balance according to Clause 7, the time patterns to be detected can be easily related to the contents of the operations of the predetermined section.

(Clause 8) In the electronic balance according to one of Clauses 1-7, the operation of the predetermined section related to the time patterns may be an operation for making the detection signal of the non-contact sensor invalid.

In the electronic balance according to Clause 8, the non-contact sensor can be used to make the detection signal of the non-contact sensor invalid and prevent the predetermined section of the electronic balance from being unintentionally activated. The non-contact sensor whose detection signal is treated as invalid may be identical to or different from the non-contact sensor through which the operation for making the detection signal invalid is performed.

(Clause 9) In the electronic balance according to one of Clauses 1-7, the operation of the predetermined section related to the time patterns may be an operation for switching the detection signal of the non-contact sensor between a state in which the detection signal is treated as invalid and a state in which the detection signal is treated as valid.

In the electronic balance according to Clause 9, not only the operation for making the detection signal of the non-contact sensor invalid but also the operation for making the same signal valid can be performed through the non-contact sensor. In this case, the time pattern for making the detection signal valid may be identical to or different from the time pattern for making the same signal invalid.

(Clause 10) The electronic balance according to Clause 8 or 9 may further include an informing means configured to inform that the detection signal of the non-contact sensor is treated as invalid.

In the electronic balance according to Clause 10, the content of the information provided by the informing means allows the user to easily understand whether the detection signal of the current non-contact sensor should be treated as valid or invalid (i.e., whether or not the non-contact sensor is available).

The invention claimed is:

1. An electronic balance, comprising:
   a non-contact sensor configured to detect an object;
   a state identifier configured to identify a time pattern of a detection signal of the non-contact sensor as one of a first time pattern and a second time pattern; and
   an operation controller configured to control an operation of a first predetermined section of the electronic balance related to the first time pattern identified by the state identifier and an operation of a second predetermined section of the electronic balance related to the second time pattern identified by the state identifier.

2. The electronic balance according to claim 1, wherein:
   the state identifier is configured to identify the time pattern as one of the first time pattern and the second time pattern based on at least one of following periods of time in the detection signal of the non-contact sensor: a period of time from a rising edge to a falling edge, a period of time from the falling edge to the rising edge, a period of time from the rising edge, and a period of time from the falling edge.

3. The electronic balance according to claim 1, further comprising:
   a windshield surrounding a measuring pan and having a door that can be opened and closed, as well as a motor configured to drive the door to open and close,
   wherein one of the first predetermined section and the second predetermined section is the motor.

4. The electronic balance according to claim 1, further comprising:
   a display controller configured to allow for a switching of a display on a display section between a first display screen configured to show a measured value of the sample, and a second display screen configured to show the first time pattern and the second time pattern and contents of operations of the first predetermined section and the second predetermined section respectively related to the first of time pattern and the second time pattern,
   wherein one of the first predetermined section and the second predetermined section is the display controller.

5. The electronic balance according to claim 1, further comprising:
   a display controller configured to allow for a switching of a display on a display section between a measured-value display screen configured to show a measured value of the sample, and a setting screen configured to show an item for setting the operation of the predetermined section of the electronic balance, where the display controller performs a control for the switching between the measured-value display screen and the setting screen when the state identifier recognized the first predetermined time pattern; and a setting-change processor configured to perform a processing for changing a setting of the operation of the second predetermined section when the state identifier recognized the second predetermined time pattern in a situation in which the setting screen is displayed on the display section.

6. The electronic balance according to claim 5, wherein the operation of the second predetermined section is the non-contact sensor.

7. The electronic balance according to claim 1, further comprising:

a storage section for storing a pattern table which holds the first time pattern and the second time pattern and the operations of the first predetermined section and the second predetermined section respectively related to the first time pattern and the second time pattern.

8. The electronic balance according to claim 1, wherein:

one of the operation of the first predetermined section and the operation of the second predetermined section is an operation for making the detection signal of the non-contact sensor invalid.

9. The electronic balance according to claim 1, wherein:

one of the operation of the first predetermined section and the operation of the second predetermined section is an operation for switching the detection signal of the non-contact sensor between a state in which the detection signal is treated as invalid and a state in which the detection signal is treated as valid.

10. The electronic balance according to claim 8, further comprising:

an informing means configured to inform that the detection signal of the non-contact sensor is treated as invalid.

* * * * *